(12) United States Patent
Shikii et al.

(10) Patent No.: US 8,233,113 B2
(45) Date of Patent: Jul. 31, 2012

(54) SURFACE ILLUMINATION APPARATUS AND LIQUID CRYSTAL DISPLAY USING SAME

(75) Inventors: Shinichi Shikii, Nara (JP); Tatsuo Itoh, Osaka (JP); Hiroyuki Furuya, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 12/919,923

(22) PCT Filed: Apr. 2, 2010

(86) PCT No.: PCT/JP2010/002453
§ 371 (c)(1),
(2), (4) Date: Aug. 27, 2010

(87) PCT Pub. No.: WO2010/116702
PCT Pub. Date: Oct. 14, 2010

(65) Prior Publication Data
US 2011/0058122 A1 Mar. 10, 2011

(30) Foreign Application Priority Data
Apr. 8, 2009 (JP) ................................. 2009-093809

(51) Int. Cl.
*G02F 1/1335* (2006.01)
(52) U.S. Cl. ................. 349/62; 349/61; 349/63; 349/65; 349/67; 349/69
(58) Field of Classification Search ............. 349/56, 349/61, 62, 63, 65, 67, 69, 84, 96, 99
See application file for complete search history.

(56) References Cited

U.S. PATENT DOCUMENTS

| | | | | |
|---|---|---|---|---|
| 6,151,089 | A * | 11/2000 | Yang et al. ................. | 349/113 |
| 7,039,076 | B2 * | 5/2006 | Kane et al. .................. | 372/6 |
| 7,830,473 | B2 * | 11/2010 | Furuya et al. ................. | 349/61 |
| 2008/0247150 | A1 | 10/2008 | Itoh et al. | |

FOREIGN PATENT DOCUMENTS

| | | |
|---|---|---|
| JP | 11-218760 | 8/1999 |
| JP | 2004-271871 | 9/2004 |
| JP | 2006-12722 | 1/2006 |
| JP | 2008-277279 | 11/2008 |
| WO | 2008/132773 | 11/2008 |

OTHER PUBLICATIONS

International Search Report issued Jun. 15, 2010 in International (PCT) Application No. PCT/JP2010/002453.

* cited by examiner

*Primary Examiner* — Jennifer Doan
(74) *Attorney, Agent, or Firm* — Wenderoth, Lind & Ponack, L.L.P.

(57) ABSTRACT

A surface illumination apparatus has: a plurality of light sources (12a, 12b) which emit lights; a light guiding plate (15) which allows the lights emitted from the light sources to enter through one of the side faces and emits the lights through one principal plane; a polarizing filter (19) which transmits lights in a predetermined polarizing direction and reflects lights in a polarizing direction perpendicular to the predetermined polarizing direction; a polarizing modulation plate (18) which performs predetermined modulation on the polarizing characteristics of the incident lights; and a reflection sheet (17) which regularly reflects the incident light. The polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from the plurality of light sources include linearly polarized lights of which polarizing directions are perpendicular to each other in a stage of the lights entering the light guiding plate, and the polarizing modulation plate has a polarizing modulation cell (18a) which functions as a ½ wavelength plate, and a non-modulation cell (18b) which does not modulate the polarizing characteristics.

17 Claims, 14 Drawing Sheets

SURFACE ILLUMINATION APPARATUS AND LIQUID CRYSTAL DISPLAY USING SAME

TECHNICAL FIELD

The present invention relates to a low cost surface illumination apparatus and a liquid crystal display with high light utilization efficiency using the same.

BACKGROUND ART

In recent years, the development of a surface illumination apparatus and an image display using a light source constituted by semiconductor material, such as a light emitting diode (LED) and laser, which does not contain mercury and has low power consumption is being promoted in terms of environmental issues and power saving.

There is a liquid crystal display as an example of image displays. A liquid crystal display uses a liquid crystal panel as a spatial modulation device, and forms images by illuminating from the rear face of the liquid crystal panel using a surface illumination apparatus (backlight), and spatially modulating the transmitted light. Available methods used for decreasing power consumption of the liquid crystal display are a method of aligning lights emitted from the backlight into single polarized lights, or a method of illuminating each sub-pixel of red, green and blue constituting the liquid crystal panel with incident light which is separated into a corresponding color (wavelength).

For example, a configuration of aligning the polarizing directions of lights to enter the light guiding plate, by allowing the laser beams emitted from the laser light source transmit through a plurality of rows of polarizing prisms, has been disclosed (e.g. Patent Document 1). Since the polarizing directions of the laser beams emitted from the principal plane of the light guiding plate can be aligned by this configuration, a liquid crystal display of which power consumption is low can be implemented.

Another example is a configuration of aligning the polarizing components of lights emitted from the light guiding plate in a predetermined direction by allowing the lights from the LED light sources, disposed on the side face of a light guiding plate, to enter into the light guiding plate and forming micro-slits, as polarization change means, on the rear face of the light guiding plate (e.g. Patent Document 2). By this configuration, lights having polarizing components in a predetermined direction can be emitted even if an LED is used for the light source, and a liquid crystal display of which power consumption is low can be implemented.

Another configuration proposed is a configuration of allowing white lights from the LED light sources, disposed on the side face of a light guiding plate, to enter into the light guiding plate, wherein an interference filter which reflects the lights in a predetermined wavelength range and transmits the lights in the rest of the wavelength range, is disposed (e.g. Patent Document 3). By separating the entered white lights into red, green and blue, and illuminating the liquid crystal panel in this way, the lights can be efficiently used, whereby the liquid crystal display of which power consumption is low can be implemented.

Other than these examples, many examples of surface illumination apparatuses, in which a predetermined area is illuminated by a predetermined color of light, are seen in our daily lives, such as a route guiding plate and traffic light used on roadways.

In the above mentioned prior art, however, light utilization efficiency is high but the configuration of the optical system is complicated, therefore manufacturing the apparatus is not easy, and the cost of the surface illumination apparatus and liquid crystal display becomes high.

Patent Document 1: Japanese Patent Application Laid-open No. 2008-277279
Patent Document 2: Japanese Patent Application Laid-open No. 2004-271871
Patent Document 3: Japanese Patent Application Laid-open No. 2006-12722

DISCLOSURE OF THE INVENTION

With the foregoing in view, it is an object of the present invention to solve the above problem of the prior art, and provide a surface illumination apparatus which can selectively illuminate an arbitrary area using having an extremely simple optical system configuration.

A surface illumination apparatus according to an aspect of the present invention has: a plurality of light sources which emit lights; a light guiding plate which allows lights emitted from the light sources to enter through one side face and emits the lights through one principal plane; a polarizing filter which transmits lights in a predetermined polarizing direction and reflects lights in a polarizing direction perpendicular to the predetermined polarizing direction; a polarizing modulation plate which performs predetermined modulation on the polarizing characteristics of the incident lights; and a reflection sheet which regularly reflects the incident lights, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from the plurality of light sources include linearly polarizing lights of which polarizing directions are perpendicular to each other in a stage of the lights entering the light guiding plate, and the polarizing modulation plate further has a polarizing modulation cell which functions as a ½ wavelength plate, and a non-modulation cell which does not modulate the polarizing characteristics.

This surface illumination apparatus can selectively illuminate an arbitrary area by an extremely simple optical system configuration.

BEST MODE FOR CARRYING OUT THE INVENTION

Figure 1:
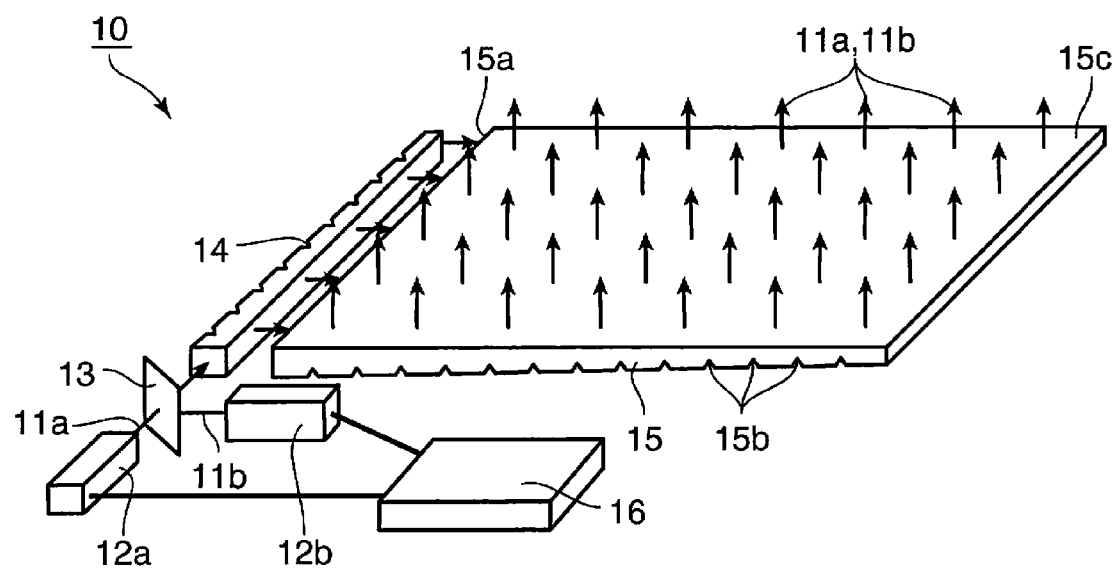
FIG. 1 is a perspective view of a surface illumination apparatus according to Embodiment 1 of the present invention.

Each embodiment of the present invention will now be described with reference to the drawings. A same composing element is denoted with a same reference symbol, and description thereof may be omitted. Each composing element is schematically shown in the drawings so as to assist in understanding.

Embodiment 1

Figure 2:
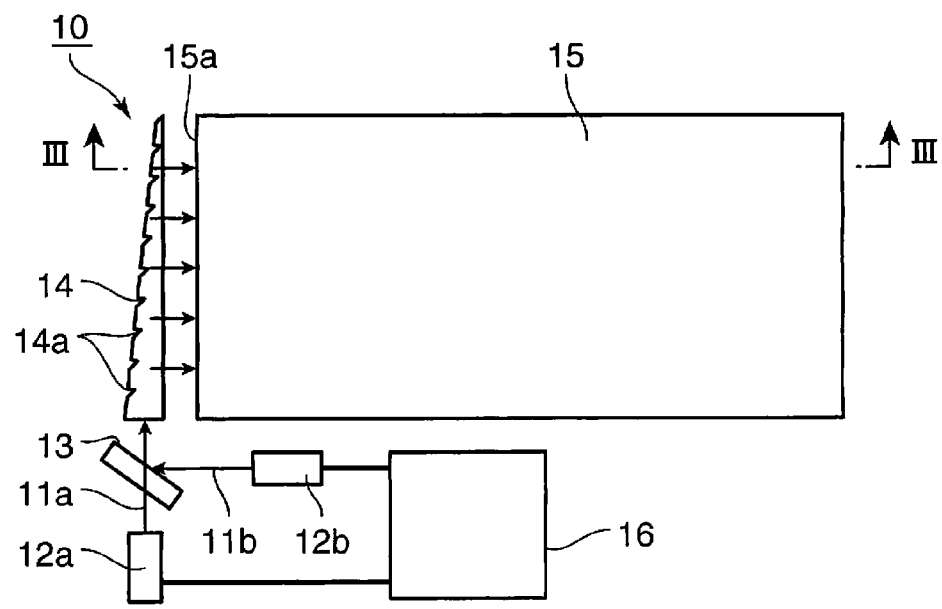
FIG. 2 is a top view of the surface illumination apparatus according to Embodiment 1 of the present invention.
Figure 3:
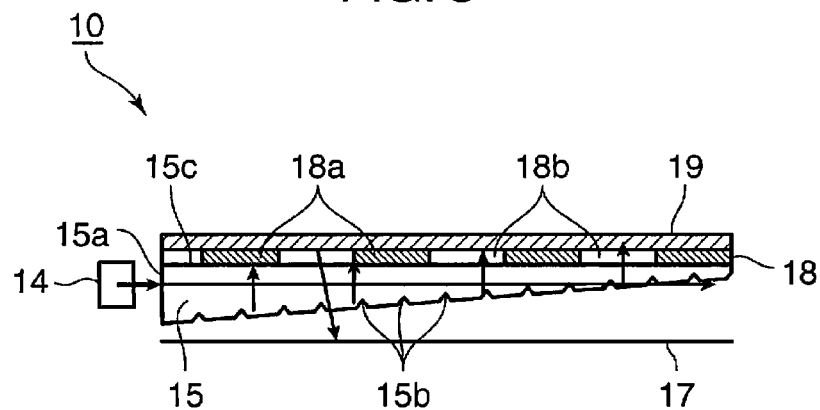
FIG. 3 is a cross-sectional view of the surface illumination apparatus sectioned at the III-III line shown in FIG. 2.

FIG. 1 to FIG. 3 are diagrams depicting a surface illumination apparatus 10 according to Embodiment 1 of the present invention, where FIG. 1 and FIG. 2 are a perspective view and a top view of a portion of the surface illumination apparatus 10 from which a polarizing filter 19, a polarizing modulation plate 18 and a reflection sheet 17 are removed, and FIG. 3 is a cross-sectional view of the surface illumination apparatus 10 sectioned at the III-III line in FIG. 2, including the polarizing modulation plate 18, the polarizing filter 19 and the reflection sheet 17.

This surface illumination apparatus 10 has light sources 12*a* and 12*b* which emit lights 11*a* and 11*b* respectively, a control unit 16 connected to the light sources 12*a* and 12*b*, a combiner 13 which combines the lights 11*a* and 11*b*, a light guiding bar 14 which linearly transforms the lights 11*a* and 11*b*, a light guiding plate 15 which transforms the linear lights into surface lights and emits the surface lights, the reflection sheet 17, the polarizing modulation plate 18 and the polarizing filter 19.

The mechanism until transforming the lights 11*a* and 11*b* into surface lights will be described first with reference to FIG. 1 to FIG. 3. The lights 11*a* and 11*b* emitted from a plurality of light sources 12*a* and 12*b* are multiplexed by the combiner 13, and then enter the light guiding bar 14 and are transformed into linear lights. On one surface of the light guiding bar 14 in the longitudinal direction, a prism array, in which many total reflection prisms 14*a* are disposed as shown in FIG. 2, is constructed. By using this light guiding bar 14, the lights 11*a* and 11*b*, which reached each total reflection prism 14*a*, are totally reflected toward the light guiding plate 15 side without reflection loss, and are emitted from the light guiding bar 14 to the light guiding plate 15 as linear lights, and enter the light guiding plate 15 through an entrance plane 15*a*. The side face to which the lights emitted from the plurality of light sources 12*a* and 12*b* enter is not limited to the entrance plane 15*a*, but may enter through another side face.

The lights 11*a* and 11*b* that entered the light guiding plate 15 are totally reflected by a linear total reflection prism 15*b* (see FIG. 3) disposed on the bottom face of the light guiding plate 15 without loss, just like the case of the total reflection prism 14*a* of the light guiding bar 14, and emitted as surface lights through the principal plane of the light guiding plate 15*c* roughly vertical. Here, as shown in FIG. 3, the polarizing modulation plate 18 and the polarizing filter 19 are disposed near the principal plane 15*c* of the light guiding plate 15 of the surface illumination apparatus 10 in order of the polarizing modulation plate 18 and the polarizing filter 19 from the light guiding plate 15 side, and the reflection sheet 17 is disposed near the opposite principal plane of the principal plane 15*c* of the light guiding plate 15. In this surface illumination apparatus 10, the light guiding bar 14 and the light guiding plate 15 are separated, but may be integrated into one light guiding plate.

Now the mechanism of the operation of the polarizing modulation plate 18 will be described with reference to FIG. 2. It is assumed that the lights 11*a* and 11*b* emitted from the light sources 12*a* and 12*b* are linearly polarized lights, and the polarizing directions thereof are perpendicular to each other. For example, as FIG. 4 shows, it is assumed that the light sources 12*a* and 12*b* are disposed so that the polarizing direction of the light 11a is a polarizing direction that is a lateral direction with respect to the traveling direction, and a polarizing direction of the light 11b is a polarizing direction that is longitudinal with respect to the traveling direction in the light guiding bar 14.

Figure 4:
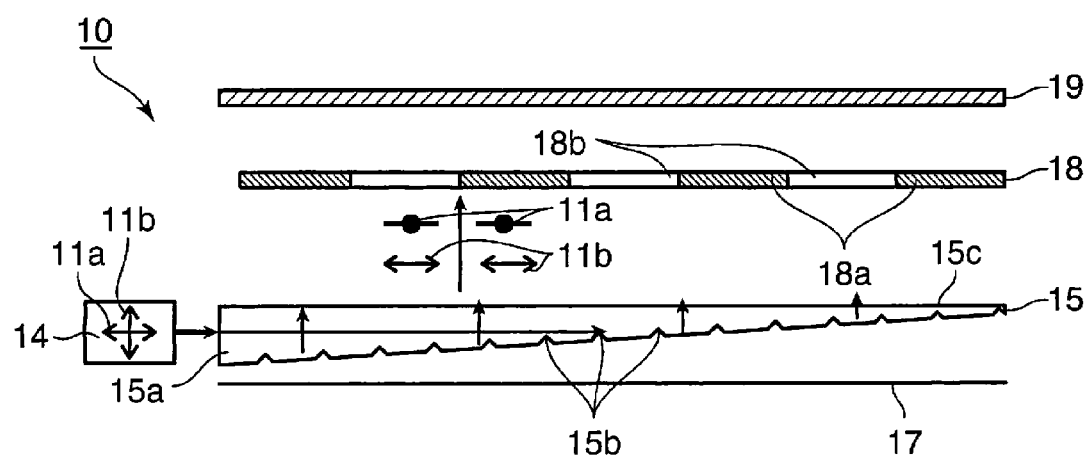
FIG. 4 is a first diagram depicting a polarizing direction of light in the surface illumination apparatus according to Embodiment 1 of the present invention.

In this case, as FIG. 4 shows, the polarizing direction of the light 11a which is totally reflected by the total reflection prism 14a in the light guiding bar 14, totally reflected by the total reflection prism 15b in the light guiding plate 15 and emitted through the principal plane 15c of the light guiding plate, is a direction perpendicular to the page face (direction indicated by black dot in FIG. 4), and the polarizing direction of the light 11b is a horizontal direction on the page face (arrow direction in FIG. 4). The polarizing modulation plate 18 is constituted by polarizing modulation cells 18a which function as ½ wavelength plates, and the two types of areas of non-modulation cells 18b which do not modulate the polarizing characteristics of the incident lights.

Figure 5:
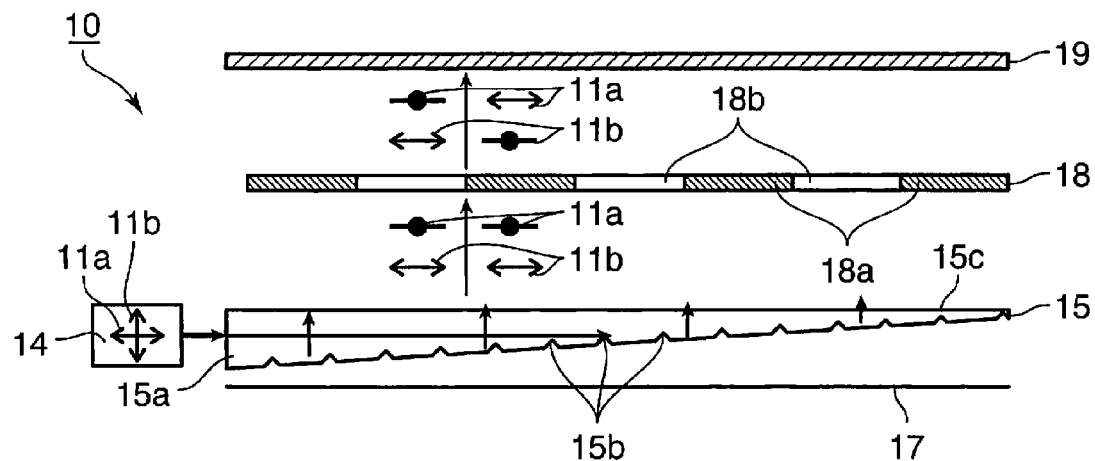
FIG. 5 is a second diagram depicting a polarizing direction of light in the surface illumination apparatus according to Embodiment 1 of the present invention.

At this time, the polarizing directions of the lights 11a and 11b transmitted through the polarizing modulation cell 18a, which function as ½ wavelength plates, rotate 90° respectively, so as FIG. 5 shows, the light 11a is polarized in the horizontal direction on the page face, and the light 11b is polarized in the vertical direction on the page face. The polarizing directions of the lights 11a and 11b transmitted through the non-modulation cell 18b, which does not modulate the polarized characteristics, are not modulated by the polarizing modulation plate 18, so the polarizing direction of the light 11a remains as a direction perpendicular to the page face, and the polarizing direction of the light 11b remains as a horizontal direction on the page face, and the lights 11a and 11b reach the polarizing filter 19. Therefore the polarizing directions of the lights 11a and 11b, which reached the polarizing filter 19, are different for each polarizing modulation cell 18a and non-modulation cell 18b of the polarizing modulation plate 18 through which lights has transmitted.

Figure 6:
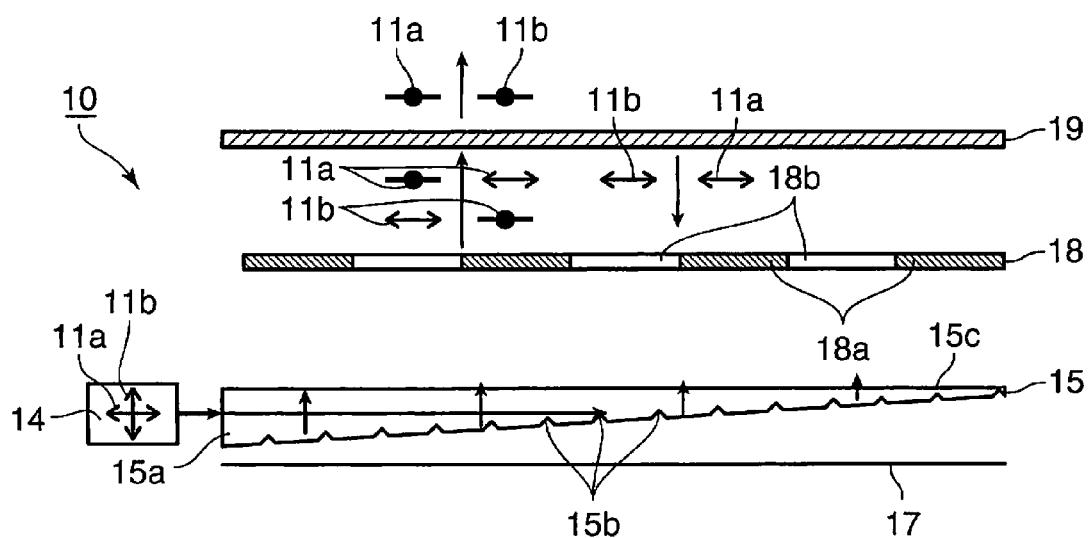
FIG. 6 is a third diagram depicting a polarizing direction of light in the surface illumination apparatus according to Embodiment 1 of the present invention.

If the polarizing filter 19 has a characteristic of transmitting the lights, which are polarized in a direction perpendicular to the page face and reflecting the lights which are polarized in a horizontal direction on the page face, only the light 11b, out of the lights transmitted through polarizing modulation cells 18a, transmits through the polarizing filter 19, and the light 11a is reflected as shown in FIG. 6. In the same manner, only the light 11a, out of the lights transmitted through the non-modulation cells 18b, transmits through the polarizing filter 19, and the light 11b is reflected. In FIG. 6, the lights 11a and 11b reflected by the polarizing filter 19 are illustrated as a reflection to each polarizing modulation cell 18a and 18b at the right hand side to simplify explanation, but needless to say, the lights 11a and 11b return to the same polarizing modulation cell and non-modulation cell.

The lights 11a and 11b reflected by the polarizing filter 19 return to the polarizing modulation plate 18, but if the polarizing modulation plate 18 and the polarizing filter 19 are contacted, the lights 11a reflected by the polarizing filter 19 returns to the polarizing modulation cells 18a, and the light 11b returns to the non-modulating cells 18b.

Figure 7:
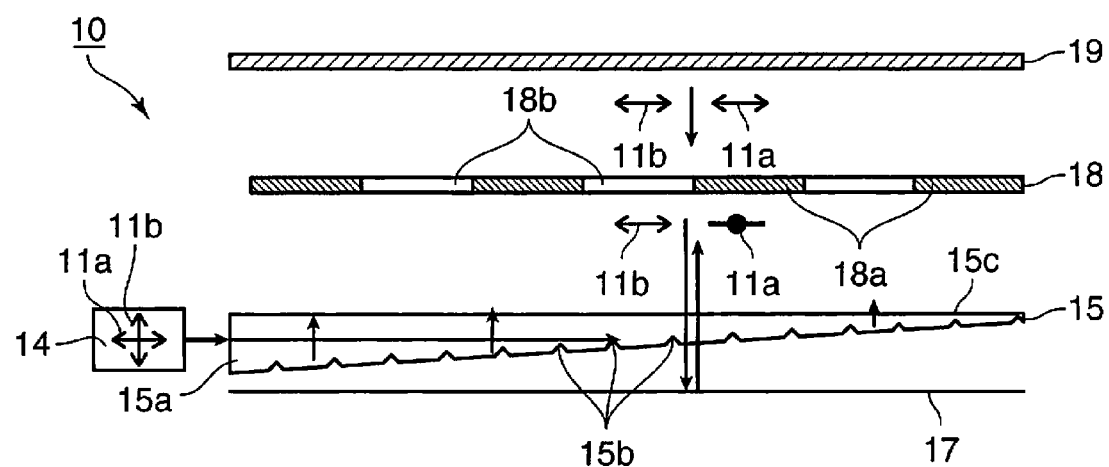
FIG. 7 is a fourth diagram depicting a polarizing direction of light in the surface illumination apparatus according to Embodiment 1 of the present invention.

Now the polarizing direction of lights which transmit through the polarizing modulation plate 18 in the downward direction in the drawing will be described with reference to FIG. 7. The light 11a, after transmitting through the polarizing modulation cell 18a, turns its polarizing direction 90° with respect to the traveling direction, so the polarizing direction of the light 11a, transmitted through the polarizing modulation plate 18, is transformed again to the direction perpendicular to the page face. The light 11b, of which polarizing direction is not influenced when transmitting through the non-modulation cell 18b, transmits through the polarizing modulation plate 18 while maintaining the polarizing direction, which is in the horizontal direction on the page face.

Here the lights propagating the space between the light guiding plate 15 and the polarizing modulation plate 18 have the same polarizing direction, whether the light propagates upward on the page face or whether the light is reflected by the polarizing filter 19 and propagates downward on the page face, and the light 11a has a polarizing direction which is perpendicular to the page face, and the light 11b has a polarizing direction horizontal on the page face. Therefore the light which was reflected by the polarizing filter 19, propagated downward on the page face, transmitted through the light guiding plate 15 and reflected by the reflection sheet 17, has the same polarizing direction as FIG. 4.

Hence if the light, which entered the light guiding plate 15 and which is totally reflected by the total reflection prism 15b, is emitted through the principal plane 15c of the light guiding plate 15 while slightly spreading in the horizontal direction on the page face, the light performs multiple reflection between the polarizing filter 19 and the reflection sheet 17 until transmitting through the non-modulation cell 18b (in the case of the light 11a), or until transmitting through the polarizing modulation cell 18a (in the case of the light 11b). As a result, the light 11a is emitted only upward from the non-modulation cell 18b, and the light 11b is emitted only upward from the polarizing modulation cell 18a without generating any light quantity loss.

In order to emit the lights 11a and 11b through the principal plane 15c of the light guiding plate 15 while allowing them to spread in the horizontal direction on the page face, a slight curvature may be created in the total reflection prism 15b, for example, or a slight curvature may be created in the entrance plane 15a of the light guiding plate 15. This method is not especially limited, and another method can be used with certainty. The light which entered the light guiding plate 15 and which was totally reflected by the total reflection prism 15b may be emitted through the principal plane 15c of the light guiding plate 15 in a state being slightly inclined in the horizontal direction on the page face, and in this case as well, effects the same as the above mentioned case can be implemented. For example, the reflection plane of the total reflection prism 15b may be inclined by a micro-angle from the angle for reflecting light in the perpendicular direction.

The effects of the above mentioned configuration will now be described with reference to FIG. 8 as an example. For example, it is assumed that there is a pattern of left and right arrow marks shown in FIG. 8 in a sign board to be displayed as a road sign, and the lighting of the left arrow and that of the right arrow are switched during actual use. In this case, in the polarizing modulation plane 18, the shapes of the polarizing modulation cell 18a and the non-modulation cell 18b shown in FIG. 1 to FIG. 7 are formed in the shape of an arrow mark, as shown in FIG. 8, and the area 18c, other than the arrow marks, is coated by metal or a multi-layer film so that all entering lights are reflected.

If the light source 12a of the surface illumination apparatus 10 shown in FIG. 1 is turned ON at this time, the right hand side arrow, which is an area of the non-modulation cell 18b, can turn ON, and if the light source 12b is turned ON, the left hand side arrow, which is an area of the polarizing modulation cell 18a, can turn ON. In other words, the lighting area can be easily switched by the control unit 16 switching the light source to be turned ON.

Figure 8:
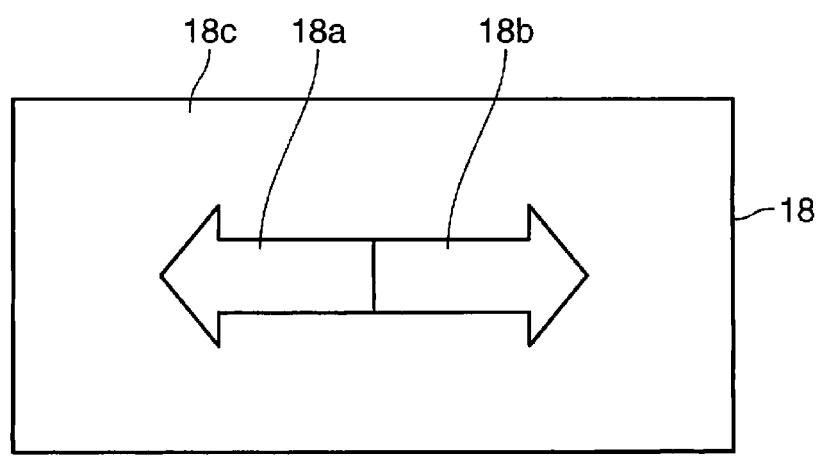
FIG. 8 is a diagram depicting an example of a sign board using the surface illumination apparatus according to Embodiment 1 of the present invention.

Further, in the case of this surface illumination apparatus, the lighting area can be easily switched even when patterns which are different from FIG. 8 are lighted, by simply changing the configuration of the polarizing modulation cell 18a, non-modulation cell 18b and the area 18c on the polarizing modulation plate 18, without requiring any change in the circuit configuration. The shapes and numbers of the polarizing modulation cells 18a and the non-modulation cells 18b are not limited to the above mentioned example, but various changes can be made according to the target to be displayed.

Figure 9:
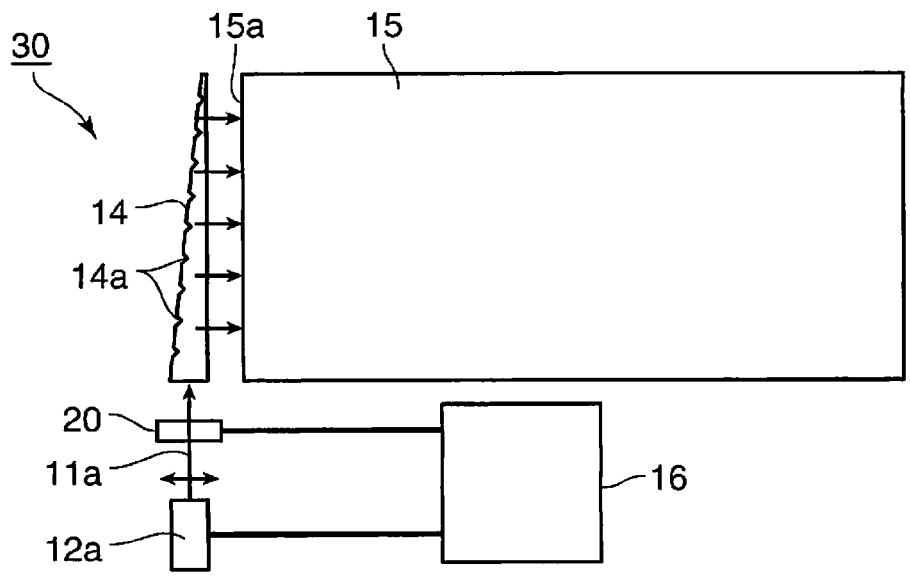
FIG. 9 is a top view depicting another surface illumination apparatus according to Embodiment 1 of the present invention.

Compared with the surface illumination apparatus 10 in FIG. 2, the surface illumination apparatus 30 shown in FIG. 9 has a similar configuration including the light guiding bar 14, but the difference is that the light source is a single light source 12a which emits the light 11a, a ½ wavelength plate 20 is disposed for the light source 12a, and the control unit 16 controls the light source 12a and the ½ wavelength plate 20.

As the surface illumination apparatus 30 in FIG. 9 shows, if the light source is the single light source 12a, the ½ wavelength plate 20 is disposed between the light source 12a and the light guiding bar 14, so that the ½ wavelength plate 20 is rotatably supported. Here as shown in FIG. 9, for example, the polarizing direction of the light emitted from the light source 12a is the horizontal direction on the page face, and the ½ wavelength plate 20 is disposed such that if this light transmits through the ½ wavelength plate 20, the polarizing direction of the lights rotates 90°. In this case, the light 11a is emitted only upward from the polarizing modulation cell 18a, and the left hand side arrow mark turns ON.

If the ½ wavelength plate 20 is rotated using a rotation mechanism (not illustrated), such as a stepping motor based on an instruction from the control unit 16, so that the light enters the light guiding bar 14 with the polarizing direction remaining in the horizontal direction on the page face, the light 11a is emitted only upward from the non-modulation cell 18b, and the right hand side arrow mark turns ON.

In this way, using the ½ wavelength plate 20 makes it possible to switch the area to be illuminated easily only by a single light source, without disposing a light source for each area, by switching the polarizing direction at a desired timing. Since the light source is a single light source and it is unnecessary to provide a separate lighting circuit for the polarizing modulation cell 18a and non-modulation cell 18b respectively, the surface illumination apparatus can be manufactured at low cost.

Here the case of the polarizing component of the light 11a, which enters the light guiding bar 14 in a direction perpendicular to the page face or horizontal direction on the page face, was described, but the polarizing direction of the light 11a may be changed at an angle between the direction perpendicular to the page face and the horizontal direction on the page face (e.g. diagonal direction) by adjusting the angle of disposing the ½ wavelength plate 20, and in this case, the left hand side arrow and the right hand side arrow can be turned ON by the ratio of the amount of polarized light in the direction perpendicular to the page face and the amount of polarized light in the horizontal direction on the page face included in the light 11a. In other words, an arbitrary area can be turned ON at an arbitrary light quantity ratio.

Figure 10:
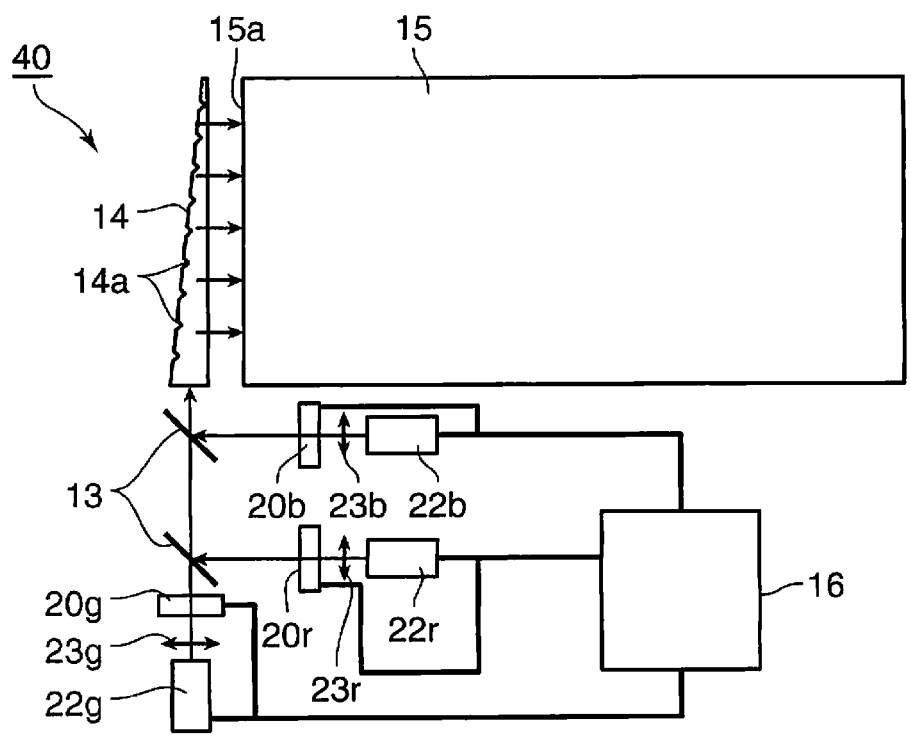
FIG. 10 is a top view depicting still another surface illumination apparatus according to Embodiment 1 of the present invention.

In FIG. 9, the polarizing direction is modulated using the single light source at a predetermined timing, but if a plurality of light sources having different wavelengths are used, as in the case of the surface illumination apparatus 40 in FIG. 10, different effects can also be implemented. In the case of the surface illumination apparatus 40 shown in FIG. 10, the configuration, including the light guiding bar 14, is similar to the surface illumination apparatus 30 in FIG. 9, but the difference is that the light source is comprised of three light sources 22r, 22g and 22b which emit lights 23r, 23g and 23b having different wavelengths, and ½ wavelength plates 20r, 20g and 20b are disposed for these light sources respectively, and each light source is connected to the control unit 16.

By the control unit 16 selecting one of the three light sources 22r, 22g and 22b as a light source to be turned ON, and controlling the polarizing direction thereof by selecting the corresponding one of the wavelength plates 20r, 20g and 20b, the areas of the polarizing modulation cell 18a and the non-modulation cell 18b in FIG. 8 can be switched and lit by switching the light having an arbitrary wavelength of the light sources 22r, 22g and 22b.

If the light sources 22r, 22g and 22b are a red light source (central wavelength: 570 to 680 nm), green light source (central wavelength: 490 to 570 nm) and blue light source (central wavelength: 400 to 490 nm), an area to be displayed can be lit in an arbitrary color by simultaneously turning each light source ON at a predetermined light quantity. If the wavelength plate of a light source to be lit in a desired color is switched at high-speed, the polarizing modulation cells 18a and 18b can be simultaneously lit visually. If a laser light source is used for each of the light sources 22r, 22g and 22b, then the color purity of each light source becomes extremely high, so a very wide color area can be displayed.

It is certainly possible to use a super-luminescent diode (SLD) for the light sources 22r, 22g and 22b. If an SLD is used for a light source, the wavelength width of the light source is increased and speckle noise can be suppressed, so a surface illumination apparatus with which visual recognition is easier can be constructed.

Figure 11:
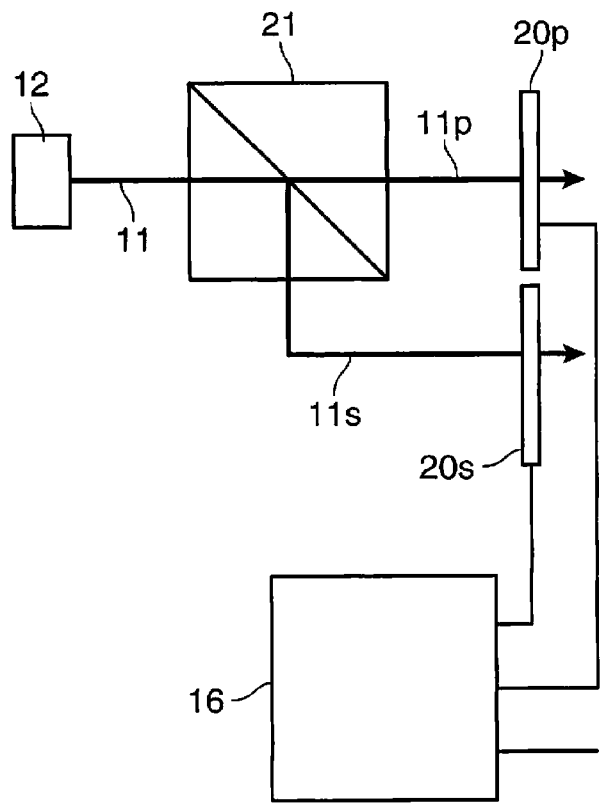
FIG. 11 is a diagram depicting an example of a non-polarizing light source which can be applied to the surface illumination apparatus according to Embodiment 1 of the present invention.

It is certainly possible to use a light emitting diode (LED) for the light sources 22r, 22g and 22b. Generally the polarizing directions of the lights emitted from a light emitting diode are often not in a single direction, but in such a case, the same configuration as above can be constructed if a polarizing beam splitter (PBS) is used. For example, a configuration in the case of using an LED as the light source 12 in FIG. 11 will be described.

When an LED is used as the light source 12, if an non-polarized light 11 emitted from an LED as the light source 12 enters the PBS 21, the non-polarized light 11 is separated into P-polarized light 11p and S-polarized light 11s, and emitted. The P-polarized light 11p enters a ½ wavelength plate 20p, and the S-polarized light 11s enters a ½ wavelength plate 20s because of such an optical component as a reflection mirror (not illustrated). In this case, both the ½ wavelength plate 20p and the ½ wavelength plate 20s are connected to the control unit 16 in advance. In this configuration, the arrangement of the ½ wavelength plate 20p and the ½ wavelength plate 20s, is controlled by the control unit 16, using a rotation mechanism (not illustrated), such as a stepping motor, so that the polarizing direction of the light 11p transmitted through the ½ wavelength plate 20p and the polarizing direction of the light 11s transmitted through the ½ wavelength plate 20s, can be arbitrarily selected. By this configuration, it is also possible to light the polarizing modulation cell 18a and the non-modulation cell 18b simultaneously at an arbitrary light quantity.

Here an example of using an LED was described, but other light sources may be used with certainty. Thus far, the polarizing modulation cell 18a and the non-modulation cell 18b were fixed as the modulation cells constituting the polarizing modulation plate 18, but the configuration of the modulation cell is not limited to the above example. For example, if a spatial modulation element, such as a liquid crystal cell, is used for the polarizing modulation cell, a plus is that the polarizing modulation amount in an arbitrary area with respect to the incident light can be arbitrarily and dynamically adjusted, and the pattern form to be illuminated can be changed arbitrarily and dynamically.

In the above described embodiment, the example of illuminating the sign board was shown, but the application of the present invention is not limited to this. In the present embodiment, the light guiding bar 14 uses the above mentioned total reflection prism 14a to reflect the lights linearly, but the configuration of the light guiding bar is not limited to this, but can be any configuration as long as the lights can be transformed into linear lights without loss while maintaining the polarizing direction. In the same way, the shape of the total reflection prism 15b of the light guiding plate 15 is not limited to the shape of the present embodiment, as long as the lights can be transformed into linear lights without loss while maintaining the polarizing direction.

Embodiment 2

Figure 12:
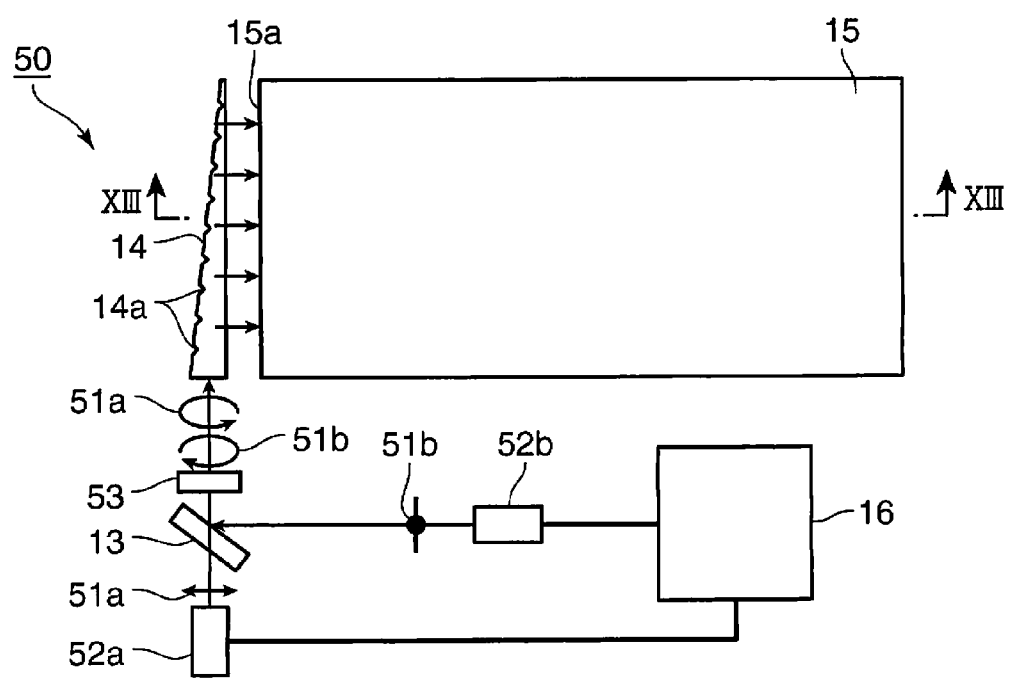
FIG. 12 is a top view of the surface illumination apparatus according to Embodiment 2 of the present invention.
Figure 13:
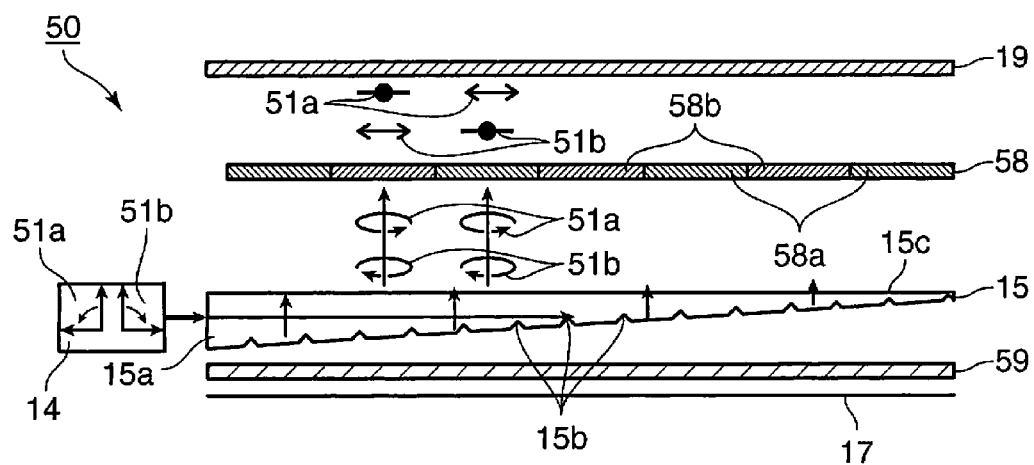
FIG. 13 is a first cross-sectional view of the surface illumination apparatus depicting the polarizing state of lights sectioned at the XIII-XIII line shown in FIG. 12.
Figure 14:
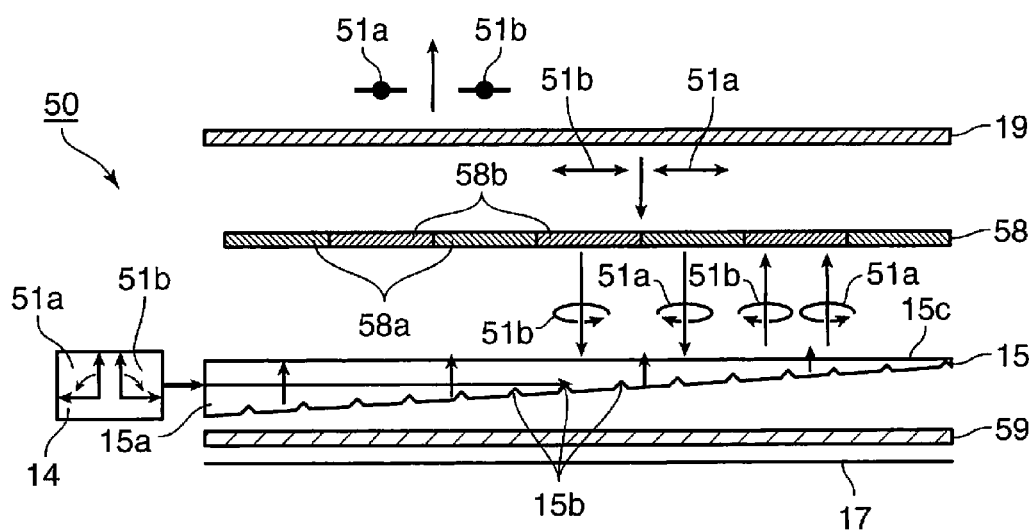
FIG. 14 is a second cross-sectional view of the surface illumination apparatus depicting the polarizing state of lights sectioned at the XIII-XIII line shown in FIG. 12.

FIG. 12 to FIG. 14 are diagrams depicting a surface illumination apparatus 50 according to Embodiment 2 of the present invention, where FIG. 12 is a top view of the surface illumination apparatus 50 excluding the polarizing filter 19, polarizing modulation plate 58, ¼ wavelength plate 59, and a reflection sheet 17, and FIG. 13 and FIG. 14 are cross-sectional views of the surface illumination apparatus 50 sectioned at the XIII-XIII line in FIG. 12.

A major difference of the present surface illumination apparatus 50 from the surface illumination apparatus 10 of Embodiment 1 is that the linearly polarized lights 51a and 51b emitted from the light sources 52a and 52b are multiplexed by a combiner 13, then a ¼ wavelength plate 53 is inserted, so as to transform the polarization of the lights 51a and 51b into rotatory polarized lights which turn in different directions from each other. As composing elements, the above mentioned ¼ wavelength plate 53 an ¼ wavelength plate 59 are added, and the ¼ wavelength plate 59 is disposed between the light guiding plate 15 and the reflection sheet 17. Further, the polarizing modulation cells 58a and 58b constituting the polarizing modulation plate 58 are constituted by ¼ wavelength plates of which crystal orientations are different from each other, that is, ¼ wavelength plates of which directions of the slow axis and fast axis are different from each other.

Now the specific mechanism of the operation of the surface illumination apparatus 50 will be described with reference to FIG. 12 to FIG. 18. First the linearly polarized lights 51a and 52b, which emitted from the light sources 52a and 52b and which are multiplexed by the combiner 13, are transformed into rotatory polarized lights by the ¼ wavelength plate 53. At this time, as shown in FIG. 12, if the lights 51a and 51b are made perpendicular to each other in advance, that is if the polarizing direction of the light 51a emitted from the light source 52a is the horizontal direction on the page face and the polarizing direction of the light 51b emitted from the light source 52b is the direction perpendicular to the page face, and are entered into the ¼ wavelength plate 53 in a state multiplexed by the combiner 13, then the light 51a and the light 51b can be transformed into rotatory polarized lights of which rotating directions are opposite from each other.

Figure 15:
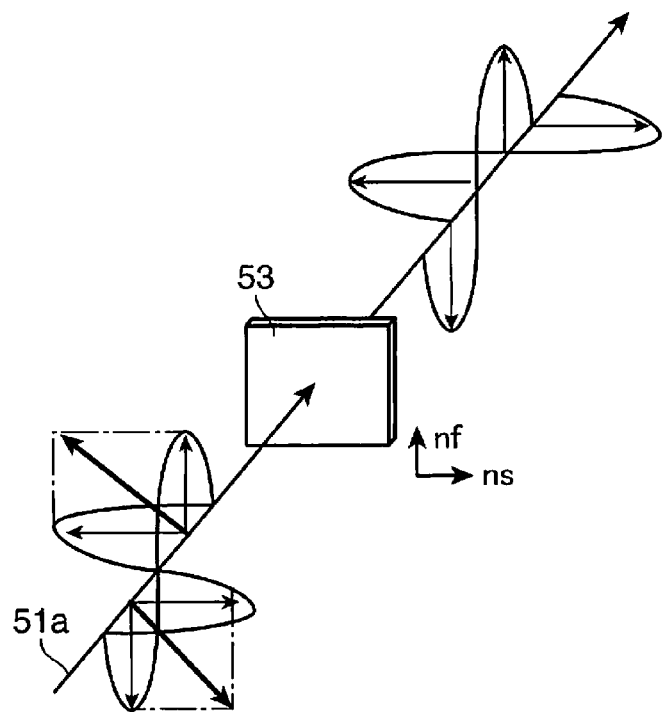
FIG. 15 is a first diagram depicting the polarizing state before and after the ¼ polarizing plate of the surface illumination apparatus according to Embodiment 2 of the present invention.
Figure 16:
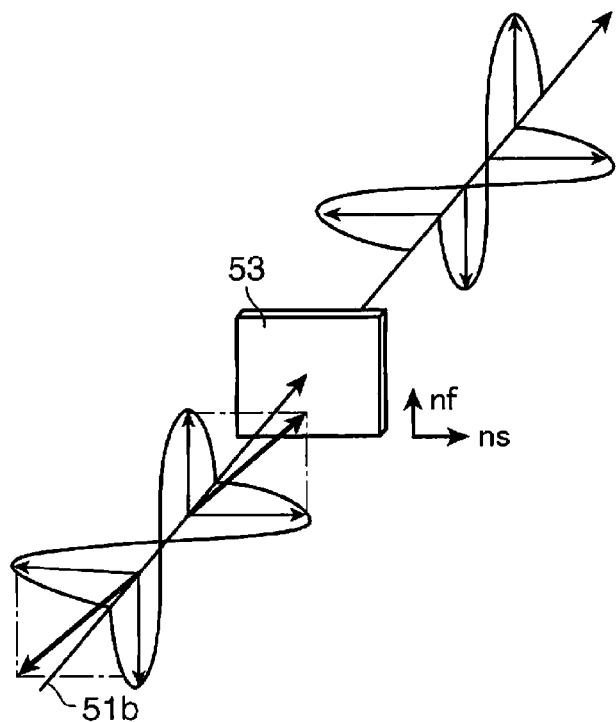
FIG. 16 is a second diagram depicting the polarizing state before and after the ¼ polarizing plate of the surface illumination apparatus according to Embodiment 2 of the present invention.

FIG. 15 depicts a state of the light 51a being transformed into a rotatory polarized light in left rotation (counterclockwise rotation in the light traveling direction), and FIG. 16 depicts a state of the light 51b being transformed into a rotatory polarized light in the right rotation (clockwise rotation in the light traveling direction). To make it easier to understand, the lights 51a and 52b, which are perpendicular to each other before entering the ¼ wavelength plate 53, are shown as the light 51a of which polarizing direction is from the upper left to the lower right with respect to the light traveling direction, and the light 51b, of which polarizing direction is from the upper right to the lower left with respect to the light traveling direction. The slow axis direction of the ¼ wavelength plate 53 is denoted as ns, and the fast axis direction thereof is nf, and the electric fields of the lights 51a and 51b are shown separately in the slow axis direction and the fast axis direction.

If the light 51a transmits through the ¼ wavelength plate 53, the component of the light 51a in the slow axis direction delays by ¼ wavelength, so the light 51a is transformed into the rotatory polarized light in left rotation, as shown in FIG. 15. In the same manner, if the light 51b transmits through the ¼ wavelength plate 53, the component of the light 51b in the slow axis direction delays by ¼ wavelength, so the light 51b is transformed into the rotatory polarized light in right rotation, as shown in FIG. 16. The optical path, until the lights 51a and 51b are emitted through the primary plane 15c of the light guiding plate 15, is the same as Embodiment 1.

When total reflection occurs in the total reflection prism 14a and the total reflection prism 15b, a relative shift is generated between the phase of the S-polarized light component and the phase of the P-polarized light component, but the polarizing component in the direction perpendicular to the page face of the light propagating in the light guiding bar 14 is totally reflected roughly vertically by the total reflection prism 14a as S-polarized light, and is then totally reflected roughly vertically by the total reflection prism 15b as P-polarized light, for example, therefore the phase shift amount is cancelled out after two total reflections.

In the same manner, the polarizing component in the horizontal direction on the page face of the light propagating in the light guiding bar 14 is totally reflected roughly vertically by the total reflection prism 14a as P-polarized light, and is then totally reflected roughly vertically by the total reflection prism 15b as S-polarized light, therefore the phase shift amount is cancelled out after two total reflections. Hence the lights 51a and 51b emitted from the light guiding plate 15 enter the polarizing modulation plate 58 as rotatory polarized lights, as shown in FIG. 13.

Here both of the polarizing modulation cells 58a and 58b of the polarizing modulation plate 58 are constituted by the ¼ wavelength plates, but the directions of rotating the polarizing direction of the lights are different from each other. The movements of the lights before and after the polarizing modulation plate 58 constructed like this will be described with reference to FIG. 17 and FIG. 18.

Figure 17:
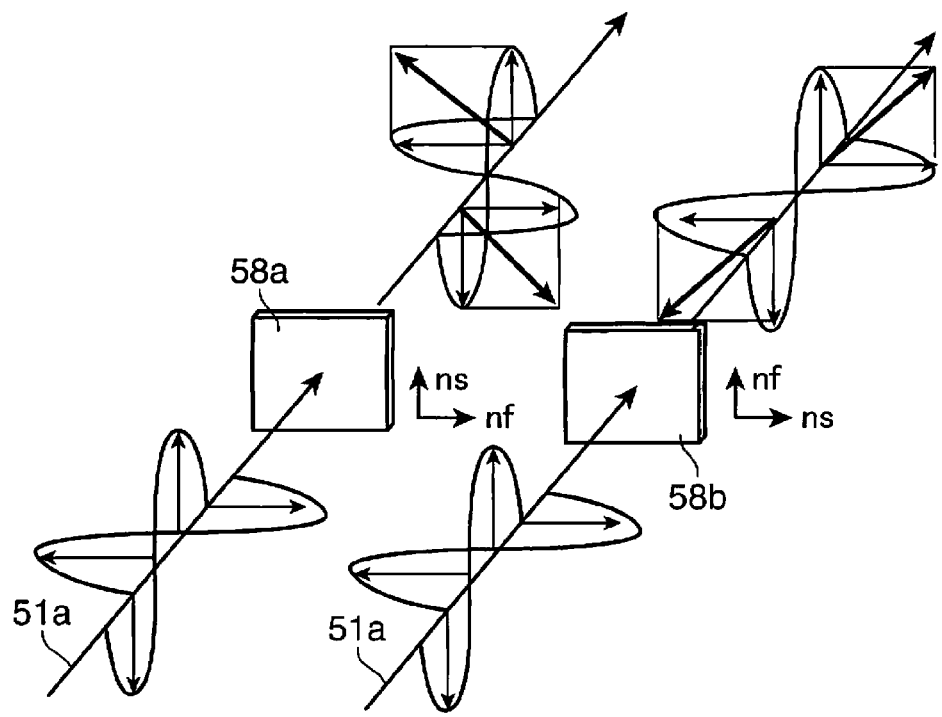
FIG. 17 is a first diagram depicting the polarizing state before and after the polarizing modulation plate of the surface illumination apparatus according to Embodiment 2 of the present invention.
Figure 18:
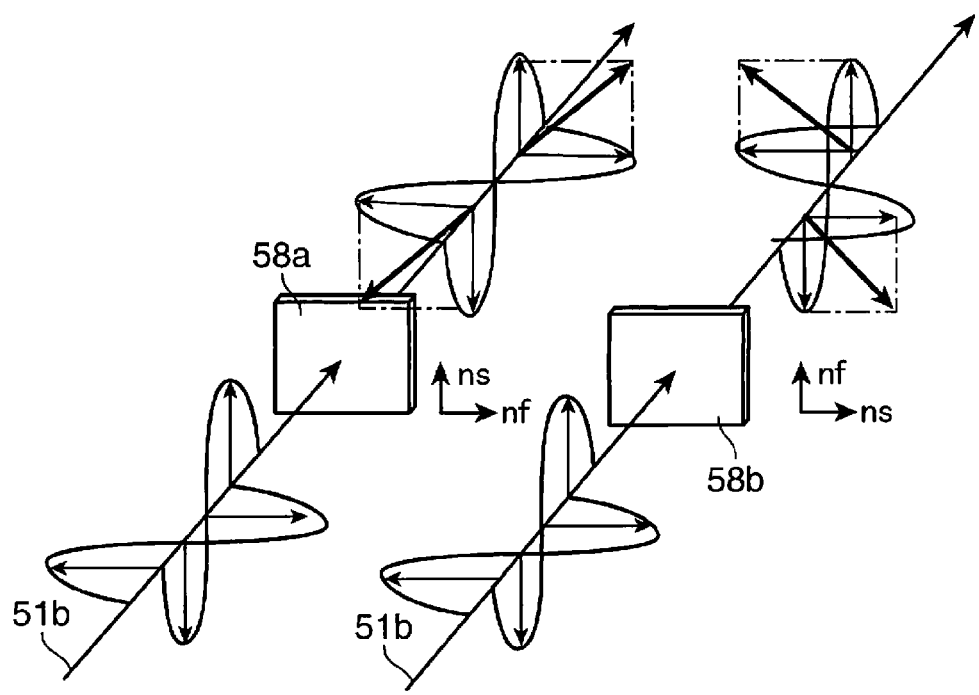
FIG. 18 is a second diagram depicting the polarizing state before and after the polarizing modulation plate of the surface illumination apparatus according to Embodiment 2 of the present invention.

The light 51a which has the rotatory polarized light in left rotation, which emitted from the light guiding plate 15 to the polarizing modulation plate 58, enters the polarizing modulation cells 58a and 58b constituting the polarizing modulation plate 58. Here the direction of the slow axis ns and the direction of the fast axis of are different between the polarizing modulation cell 58a and the polarizing modulation cell 58b, as shown in FIG. 17 and FIG. 18. If the light 51a having the rotatory polarized light in left rotation is transmitted through the polarizing modulation cell 58a and the polarizing modulation cell 58b, the light emitted from the polarizing modulation cell 58a and the light emitted from the polarizing modulation cell 58b are transformed into linearly polarized lights of which the polarizing directions are perpendicular to each other. Further the polarizing direction of the light emitted from the polarizing modulation cell 58a and the polarizing direction of the light 51a before entering the ¼ wavelength plate 53 are in the same direction with respect to the light traveling direction.

This is the same for the light 51*b*. In other words, if the light 51*b* having the rotatory polarized light in right rotation is transmitted through the polarizing modulation cell 58*a* and the polarizing modulation cell 58*b*, the light emitted from the polarizing modulation cell 58*a* and the light emitted from the polarizing modulation cell 58*b* are transformed into linearly polarized lights, of which polarizing directions are perpendicular to each other. Further the polarizing direction of the light emitted from the polarizing modulation cell 58*a* and the polarizing direction of the light 51*b* before entering the ¼ wavelength plate 53 are in the same direction with respect to the light traveling direction.

Then the lights 51*a* and 51*b*, transmitted through the polarizing modulation plate 58, enter the polarizing filter 19. Just like Embodiment 1, the polarizing filter 19 has a characteristic that reflects the polarized light in the horizontal direction on the page face, and transmits the polarized light in the direction perpendicular to the page face. Therefore as FIG. 13 and FIG. 14 show, the light 51*a*, transmitted through the polarized modulation cell 58*a*, is reflected by the polarizing filter 19, and a light 51*b* transmitted through the polarizing modulation cell 58*a* transmits through the polarizing filter 19. The light 51*a* transmitted through the polarizing modulation cell 58*b* transmits through the polarizing filter 19, and the light 51*b* transmitted through the polarizing modulation cell 58*b* is reflected by the polarizing filter 19.

The reflected light 51*a* transmits through the polarizing modulation cell 58*a*, and becomes the rotatory polarized light again. The light 51*a* which became rotatory polarized light transmits through the light guiding plate 15, reflected by the reflection sheet 17, and enters the polarizing modulation cell 58*a* again. In this way, while travelling once back and forth between the polarizing filter 19 and the reflection sheet 17, the light transmits through the polarizing modulation cell 58*a* twice, so the polarization of light rotates in the reverse direction. Therefore, the phase shift occurring while the light travels once back and forth between the polarizing filter 19 and the reflection sheet 17 is cancelled out by inserting the ¼ wavelength plate 59. In other words, the phase is further shifted for ½ wavelength while the light transmits through the ¼ wavelength plate 59 twice, so it is unnecessary to change the structure of the ¼ wavelength plate 59 with the pitch of the polarizing modulation cells 58*a* and 58*b*. This is the same for the light 51*b*.

In this way, during multiple reflection between the polarizing filter 19 and the reflection sheet 17, the light 51*a*, which transmitted through the polarizing modulation cell 58*b*, becomes a light having a polarizing direction perpendicular to the page face and transmits through the polarizing filter 19, and the light 51*b*, which transmitted through the polarizing modulation cell 58*a*, becomes a light having a polarizing direction perpendicular to the page face and transmits through the polarizing filter 19. As a result, just like the surface illumination apparatus 10 of Embodiment 1, the light 51 is emitted out of the polarizing filter 19 only upward from the polarizing modulation cell 58*b*, and the light 51*b* is emitted out of the polarizing filter 19 only upward from the polarizing modulation cell 58*a*.

As described above, the surface illumination apparatus 50, which has a different configuration from the surface illumination apparatus 10 of Embodiment 1, has similar functions as the surface illumination apparatus 10, therefore similar effects as the surface illumination apparatus 10 can be implemented. In other words, areas can be very easily switched and lit in an arbitrary lighting pattern in a sign board or the like at low cost. Lighting can be in any color using a plurality of light sources, just like the case of the surface illumination apparatus 10, and various light sources, including an LED, laser and SLD, can be used for the light source, although redundant description is omitted.

A single light source to emit a light may be used, and for example, a ½ wavelength plate may be disposed for a single light source 52*a*, just like the surface illumination apparatus 30 shown in FIG. 9, omitting the light source 52*b* and the combiner 13, so that the control unit 16 controls the single light source 52*a* and the ½ wavelength plate. In this case, the ½ wavelength plate switches the polarizing direction of the light emitted from the light source 52*a*, and transforms it into a linearly polarized light at an arbitrary timing, and the ¼ wavelength plate 53 transforms this linearly polarized light into rotatory polarized lights of which rotating directions of polarization are opposite from each other in a stage of the light entering the light guiding plate 15.

Because of this configuration, the rotatory polarized lights, of which polarizing directions can be switched at an arbitrary timing, can enter from the side face 15*a* of the light guiding plate 15 and emit from the principal plane 15*c*, so two types of rotatory polarized lights, of which rotating directions of polarization are opposite from each other, can be selectively emitted at an arbitrary timing.

In this case, the light 51*a* having rotatory polarization in left rotation becomes a first light having a polarizing direction to transmit through the polarizing modulation cell 58*b* and to transmit through the polarizing filter 19, and then transmits through the polarizing filter 19 and is emitted to the outside. The light 51*b* having rotatory polarization in right rotation, on the other hand, becomes a second light to have a polarizing direction to transmit through the polarizing modulation cell 58*b*, and to be reflected by the polarizing filter 19, and is then reflected to the inside by the polarizing filter 19.

The light 51*b* having rotatory polarization in right rotation also becomes a first light having a polarizing direction to transmit through the polarizing modulation cell 58*a* and to transmit through the polarizing filter 19, then transmits through the polarizing filter 19, and is emitted to the outside. The light 51*a* having rotatory polarization in left rotation, on the other hand, becomes a second light having a polarizing direction to transmit through the polarizing modulation cell 58*a* and to be reflected by the polarizing filter 19, and is then reflected to the inside by the polarizing filter 19.

Since the light 51*a* is emitted to the outside only through the polarizing modulation cell 58*b*, and the light 51*b* is emitted to the outside only through the polarizing modulation cell 58*a*, an arbitrary area can be selectively illuminated by an extremely simple optical system configuration, and a surface illumination apparatus that can easily switch lighting areas can be constructed easily at low cost.

Embodiment 3

Figure 19:
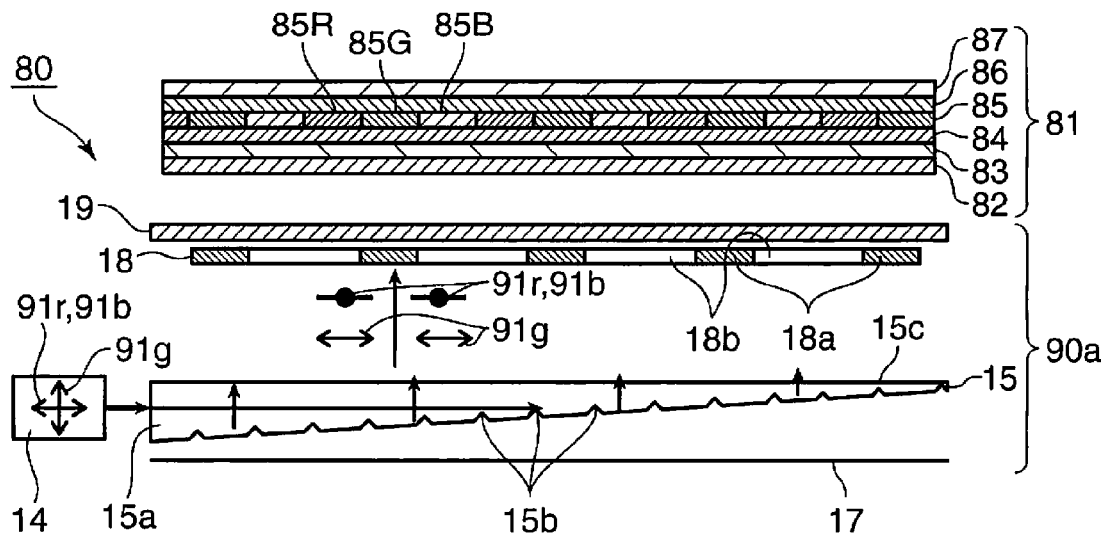
FIG. 19 is a cross-sectional view depicting a liquid crystal display according to Embodiment 3 of the present invention.
Figure 20:
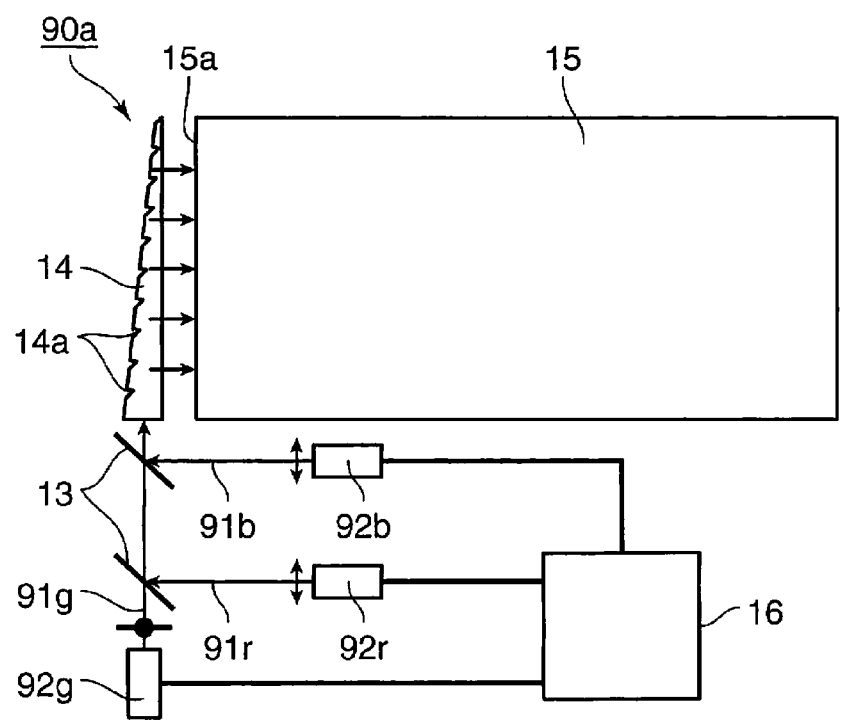
FIG. 20 is a top view depicting a liquid crystal display according to Embodiment 3 of the present invention.

A liquid crystal display according to Embodiment 3 of the present invention will now be described with reference to FIG. 19 to FIG. 21. FIG. 19 shows the liquid crystal display 80 according to Embodiment 3 of the present invention, and FIG. 20 shows a top view of a surface illumination apparatus 90*a* which illuminates the liquid crystal panel 81 of the liquid crystal display 80 from the rear face. In FIG. 20, the polarizing modulation plate 18, polarizing filter 19 and reflection sheet 17 are omitted.

The surface illumination apparatus 90*a* shown in FIG. 20 is similar to the surface illumination apparatus 40 shown in FIG. 10, but since the surface illumination apparatus 90*a* used for the liquid crystal display 80 need not switch illuminating patterns, the ½ wavelength plates 20*r*, 20*g* and 20*b* in FIG. 10 are not included. In the liquid crystal display 80, a red light source 92r, green light source 92g and blue light source 92b, which emit the red light 91r, green light 91g and blue light 91b respectively, are used as the light sources. Each light source is disposed so that each polarizing direction of the red light 91r, green light 91g and blue light 91b, which are multiplexed and enter the light guiding bar 14, is a direction perpendicular to the page face in the case of the green light 91g, and a horizontal direction on the page face in the case of the red light 91r and blue light 91b, as shown in FIG. 20.

A liquid crystal panel 81 is disposed at the light emitting side of the surface illumination apparatus 90a, and the liquid crystal panel 81 comprises a bottom polarizing plate 82, bottom glass plate 83, liquid crystal layer 84, color filter 85, top glass plate 86 and top polarizing plate 87. The color filter 85 further comprises a red sub-pixel 85R which transmits through the red light 91r and absorbs the green light 91g and blue light 91b, a green sub-pixel 85G which transmits through the green light 91g and absorbs the red light 91r and blue light 91b, and a blue sub-pixel 85B which transmits through the blue light 91b and absorbs the red light 91r and green light 91g.

The polarizing modulation plate 18 and the polarizing filter 19 are disposed between the liquid crystal panel 81 and the light guiding plate 15. In FIG. 19, there is a gap between the polarizing modulation plate 18 and the light guiding plate 15 for explanatory purposes, but this gap need not exist. The polarizing modulation plate 18 is comprised of the polarizing modulation cell 18a which functions as the ½ wavelength plate, and the non-modulation cell 18b which does not modulate the polarization characteristics, just like the surface illumination apparatus 10 and the polarizing modulation cell 18a is disposed directly under the green sub-pixel 85G, and the non-modulation cell 18b is disposed directly under the red sub-pixel 85R and blue sub-pixel 85B.

The polarizing filter 19 is disposed so as to transmit a light polarized in a direction perpendicular to the page face, and to reflect a light polarized in a horizontal direction on the page face, just like the surface illumination apparatus 10. Because of this arrangement, the polarizing direction of the green light 91g, which transmitted through the polarizing modulation cell 18a of the polarizing modulation plate 18, becomes a direction perpendicular to the page face, so the green light 91g transmits through the polarizing filter 19 and enters the green sub-pixel 85G of the liquid crystal panel 81. The polarizing direction of the green light 91g, which transmitted through the non-modulation cell 18b of the polarizing modulation plate 18, on the other hand, remains in the horizontal direction on the page face, so the green light 91g is reflected by the polarizing filter 19, and thereafter performs the multiple reflection between the polarizing filter 19 and the reflection sheet 17 until entering the polarizing modulation cell 18a of the polarizing modulation plate 18, just like the surface illumination apparatus 10.

In the same manner, the red light 91r and blue light 91b, which transmitted through the non-modulation cell 18b of the polarizing modulation plate 18, remain in the direction perpendicular to the page face, so the red light 91r and blue light 91b transmit through the polarizing filter 19 and enter the red sub-pixel 85R or blue sub-pixel 85G of the liquid crystal panel 81 without distinction. If the red light 91r or the blue light 91b transmits through the polarizing modulation cell 18a of the polarizing modulation plate 18, then the polarizing direction becomes the horizontal direction on the page face, so the red light 91r or blue light 91b is reflected by the polarizing filter 19, and thereafter performs the multiple reflection between the polarizing filter 19 and the reflection sheet 17 until entering the non-modulation cell 18b of the polarizing modulation plate 18, just like the case of the surface illumination apparatus 10.

Figure 21:
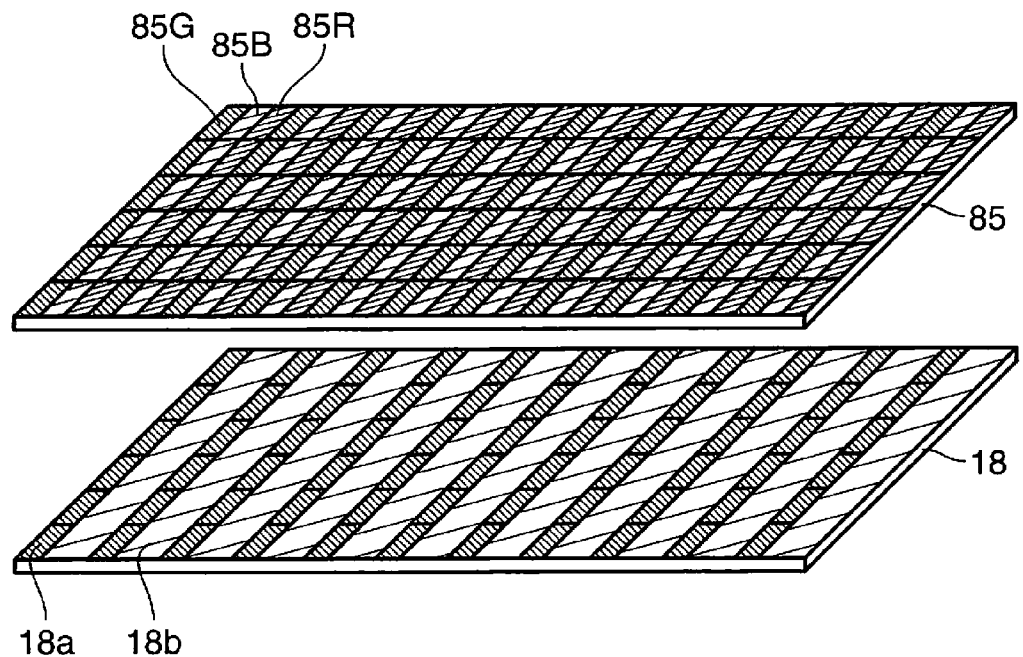
FIG. 21 is a diagram depicting a positional relationship between the polarizing modulation filter and the color filter shown in FIG. 19.

Concerning the sizes of each sub-pixel 85R, 85G and 85B in the color filter 85 and the polarizing modulation cell 18a and the non-modulation cell 18b in the polarizing modulation plate 18, the polarizing modulation cells 18a and the non-modulation cells 18b are arrayed in a matrix, as shown in FIG. 21, and the vertical and horizontal pitches of the polarizing modulation cells 18a and the non-modulation cells 18b are set to be the same or an integral multiple of the vertical and horizontal pitches of each sub-pixel 85R, 85G and 85B.

Here a modulation cell is constituted by the polarizing modulation cell 18a and the non-modulation cell 18b, the polarizing modulation plate 18 includes a plurality of modulation cells (polarizing modulation cells 18a and non-modulation cells 18b), which are arrayed in a matrix, the length of one side in the longitudinal direction of the polarizing modulation cell 18a, which is a modulation cell, and non-modulation cell 18b, is set to be the same length of one side in the longitudinal direction of the sub-pixel 85R, 85G or 85B of the color filter 85, and the length of one side in the lateral direction of the polarizing modulation cell 18a, which is a modulation cell, is set to be the same length of one side in the lateral direction of the sub-pixel 85R, 85G or 85B of the color filter 85, and the length of one side in the lateral direction of the non-modulation cell 18b, which is a modulation cell, is set to be an integral multiple (e.g. two times) of the length of one side in the lateral direction of the sub-pixel 85R, 85G or 85B of the color filter 85.

By this, the green light 91g, which emits only upward from the polarizing modulation cell 18a by the polarizing filter 19, enters only the green sub-pixel 85G, and in the same manner, the blue light 91b and red light 91r, which emit only upward from the non-modulation cell 18b, enter only the blue sub-pixel 85B and red sub-pixel 85R.

In the case of a conventional liquid crystal display, colors emitted from the light source enter each sub-pixel of the color filter without any distinction of the colors, so ⅔ of the lights which entered each sub-pixel is absorbed, and only ⅓ thereof contribute to image formation. In the case of the present liquid crystal display 80, on the other hand, the green color 91g is not absorbed by the color filter 85, and ½ of the lights of the red light 91r and the blue light 91b which enter the red sub-pixel 85R and the blue sub-pixel 85B is used, so a total of ⅔ (=⅓+(½)×(⅔)) of the lights is used, and the light utilization efficiency becomes double that of the prior art. To obtain a light quantity with a same brightness, only half the energy is required.

Generally laser beams excel in rectilinear propagation characteristics, so if a laser light source or an SLD is used for each light source 92r, 92g and 92b, the spread of light during propagation from the polarizing modulation plate 18 to each sub-pixel 85R, 85G and 85B can be suppressed. As a result, the ratio of the green light 91g, entering sub-pixels other than the green sub-pixels 85G, can be suppressed, and the ratio of the red light 91r or blue light 91b entering the green sub-pixels 85G can also be suppressed, therefore a liquid crystal display of which light utilization efficiency is high can be constructed.

An LED can be used for the light source with certainty. Normally an LED has wider spectral width than a laser light source, and dispersion of the spread angle of the emitted laser light is also large. In the case of a color corresponding to each sub-pixel selectively entering the sub-pixel, if a reflection type wavelength filter, shown in Patent Document 3 of prior art documents, is used, the dependency of the reflection wavelength filter on the angle or the wavelength is high, and especially if an LED is used for the light source, light utilization efficiency cannot be increased due to the dispersion of the incident angle and dispersion of the wavelength, as mentioned above. However in the case of the present liquid crystal display 80, the light emitted from each light source is separated not by wavelength but by polarization, so even if the incident angle or wavelength disperses, the light separation characteristics are not influenced at all, and high separation characteristics can be obtained. Therefore high light utilization efficiency can be implemented even if an LED is used for the light source.

As shown in FIG. 19, there may be a gap between the surface illumination apparatus 90*a* and the liquid crystal panel 81, or there may be no gap. If there is no gap there between, the distance from the polarizing modulation plate 18 to the color filter 85 (each sub-pixel 85R, 85G and 85B) decreases, so the loss of light due to the spread of light during propagation from the polarizing modulation plate 18 to the color filter 85 can be decreased. This is preferable since the light utilization efficiency can be further improved.

If the red light 91*r* emitted from the non-modulation cell 18*b* could enter the red sub-pixel 85R, and if the blue light 91*b* could enter the blue sub-pixel 85B, then a liquid crystal display of which light utilization efficiency is high can be constructed. For example, if a wavelength filter 101 is inserted between the polarizing filter 19 and the liquid crystal panel 81, as shown in liquid crystal display 100 in FIG. 22, then the red light 91*r* emitted from the non-modulation cell 18*b* can enter the red sub-pixel 85R, and the blue light 91*b* can enter the blue sub-pixel 85B.

Here the wavelength filter 101 includes a plurality of sub-filers 101B, 101R and 1010 having mutually different filter characteristics, and in concrete terms, the wavelength filter 101 is comprised of a sub-filer 101B which transmits through the blue light 91*b* and reflects the red light 91*r*, a sub-filter 101R which transmits through the red light 91*r* and reflects the blue light 91*b*, and a sub-filter 101G which does modulates nothing. By using this wavelength filter 101, the red light 91*r* performs multiple reflection between the wavelength filter 101 and the reflection sheet 17 until reaching the sub-filter 101R, and the blue light 91*b* also performs multiple reflection between the wavelength filter 101 and the reflection sheet 17 until reaching the sub-filter 101B.

As a result, out of the lights transmitted through the wavelength filter 101, the green light 91*g* enters the sub-pixel 85G, the red light 91*r* enters the sub-pixel 85R, and the blue light 91*b* enters the sub-pixel 85B. In other words, in the color filter 85, no component enters the sub-pixel of a different color, so the loss of light due to absorption by a color filter is prevented. As mentioned above, ⅔ of the lights which enter the color filter are lost in the prior art, but if the present liquid crystal display 100 is used, the light utilization efficiency can be improved to three times that of the prior art, and a liquid crystal display of which light utilization efficiency is very high can be constructed.

Sub-filters 101R and 101B constituting the wavelength filter 101 can normally be constructed by layering a plurality of dielectric multi-layer films having a different refractive index respectively. If the sub-filter 101R and the sub-filter 101B, constituting the wavelength filter 101, are adjacent to each other, as in this case, a plurality of dielectric multi-layer films are layered in a state of masking the areas of the sub-filter 101B and the sub-filter 101G to manufacture the sub-filter 101R, for example, and in the same manner, a plurality of dielectric multi-layer films are layered in a state of masking the areas of the sub-filter 101R and the sub-filter 101G to manufacture the sub-filter 101B. The manufacturing method and configuration of the wavelength filter 101 described here are merely an example, and do not limit the manufacturing method or configuration thereof, but any manufacturing method and configuration can be used only if the desired wavelength characteristics can be obtained.

In the case of constituting the sub-filters 101R and 101B of the wavelength filter 101 by dielectric multi-layer films, if a wavelength to be transmitted and a wavelength to be reflected are close together, a number of films to be layered increases since it is necessary to provide sharp wavelength characteristics to the sub-filters 101R and 101B constituting the wavelength filter respectively. For example, in the case of the sub-filter for reflecting the blue light and transmitting through the green light, if the wavelength of the green light is 530 nm and the wavelength of the blue light is 450 nm, then the transmission characteristic and the reflection characteristic must be switched at 80 nm intervals.

Therefore according to the present liquid crystal display 100, the green light, which has an intermediate wavelength of the three colors, is the light that is separated by the polarizing modulation plate 18 and the polarizing filter 19, and the blue light and the red light are the lights separated by the wavelength filter 101, whereby if the wavelength of the red light is 630 nm and the wavelength of the blue light is 450 nm, for example, the transmission characteristic and the reflection characteristic can be switched at 180 nm intervals, and each sub-filter of the wavelength filter 101 need not have a sharp wavelength characteristic, which makes it possible to implement a cost effective liquid crystal display.

Figure 23:
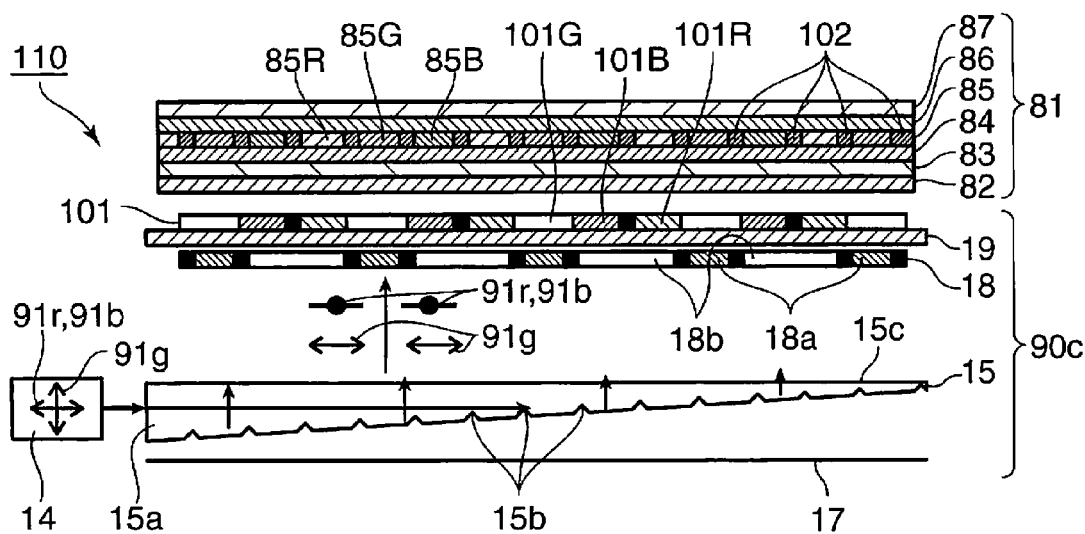
FIG. 23 is a cross-sectional view depicting still another liquid crystal display according to Embodiment 3 of the present invention.

In the boundary of each sub-pixel 85R, 85G and 85B of the color filter 85, a black matrix 102 is normally formed, as shown in FIG. 23, and in this portion, lights are essentially absorbed, that is, all the lights that enter this portion are lost. To prevent this, a total reflection area 103 constituted by a reflection coat which reflects the incident light to the light guiding plate 15 side is disposed on the boundary of the polarizing modulation cell 18*a* and the non-modulation cell 18*b* of the polarizing modulation plate 18, then all the lights that enter this total reflection area 103 can be reflected. As a result, lights entering the black matrix 102 can be suppressed, and a liquid crystal display 110 of which light utilization efficiency is even higher can be constructed.

In FIG. 23, a total reflection area 103 is disposed not only on the polarizing modulation plate 18, but also between the sub-filter 101B and the sub-filter 101R of the wavelength filter 101, so as to further suppress the loss generated by lights entering the black matrix 102. Thereby a liquid crystal display 110 of which light utilization efficiency is even higher can be constructed.

In the case of a liquid crystal display 120 shown in FIG. 24, as well, the red light 91*r*, green light 91*g* and blue light 91*b* can enter the red sub-pixel 85R, green sub-pixel 85G and blue sub-pixel 85B respectively, just like the liquid crystal display 100 shown in FIG. 22, and loss of lights in the color filter, as seen in conventional liquid crystal displays, can be prevented, by the operation described below, so the light utilization efficiency in the color filter can be improved three times compared with the prior art, and the liquid crystal display of which light utilization efficiency is high can be constructed.

Figure 24:
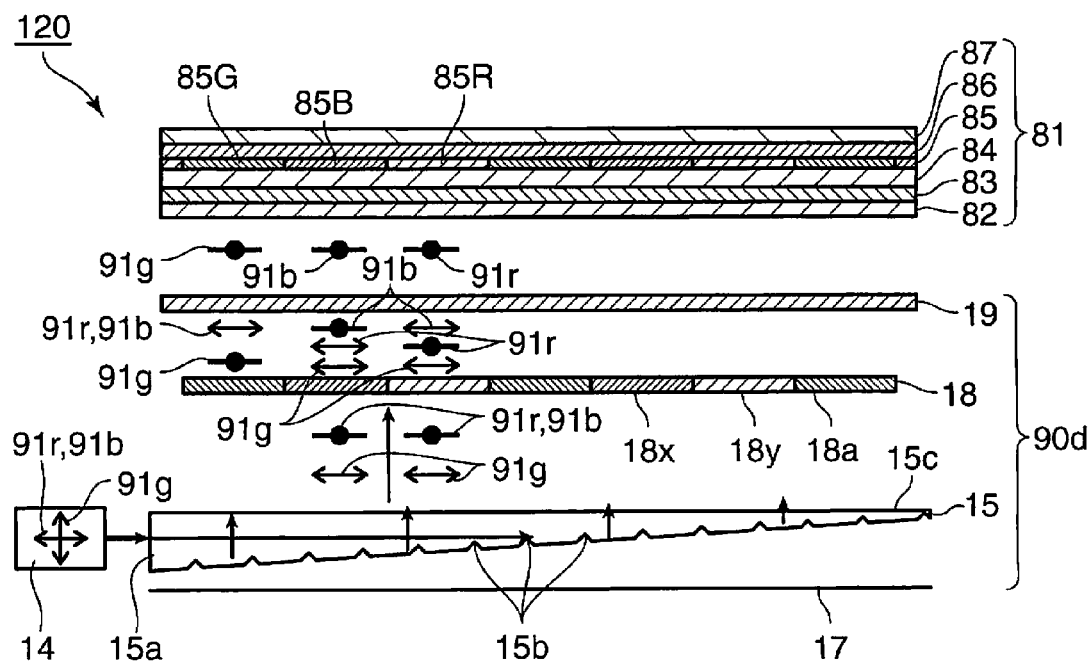
FIG. 24 is a cross-sectional view depicting still another liquid crystal display according to Embodiment 3 of the present invention.

In the liquid crystal display 120 shown in FIG. 24, which has a similar configuration as the liquid crystal display 80 shown in FIG. 19, a polarizing modulation cell 18*x* and a polarizing modulation cell 18*y* are added instead of the non-modulation cell 18*b* in the polarizing modulation plate 18. In this case, the polarizing modulation cell 18*y* has a wavelength characteristic to transmit through the green light 91*g* and red light 91*r* without changing the polarizing direction, just like the non-modulation cell 18*b*, and change the polarizing direction of only the blue light 91*b* from the direction perpendicular to the page face to the horizontal direction on the page face, and the polarizing modulation cell 18*x* has a wavelength characteristic to transmit through the green light 91*g* and the blue light 91*b* without changing the polarizing direction, and change the polarizing direction of only the red light 91*r* from the direction perpendicular to the page face to the horizontal direction on the page face. The blue sub-pixel 85B is disposed directly above the polarizing modulation cell 18*x*, and the red sub-pixel 85R is disposed directly above the polarizing modulation cell 18*y*.

In this case, the operation of the red light 91*r*, green light 91*g* and blue light 91*b* in the polarizing modulation cell 18*a* are the same as the liquid crystal display 80. After transmitting through the polarizing modulation cell 18*x*, the polarizing direction of the red light 91*r* is the horizontal direction on the page face, and the polarizing direction of the green light 91*g* is also the horizontal direction on the page face, but the only polarizing direction of the blue light 91*b* is the direction perpendicular to the page face. In the same manner, after transmitting through the polarizing modulation cell 18*y*, the polarizing direction of the blue light 91*b* is the horizontal direction on the page face, and the polarizing direction of the green light 91*g* is also the horizontal direction on the page face, but only the polarizing direction of the red light 91*r* is the direction perpendicular to the page face.

The polarizing filter 19 is disposed so as to transmit through the polarizing component in a direction perpendicular to the page face, and reflect the polarizing component in the horizontal direction on the page face, just like the liquid crystal display 80. Thereby, from the polarizing filter 19, the green light 91*g* is emitted only upward from the polarizing modulation cell 18*a*, the blue light 91*b* is emitted only upward from the polarizing modulation cell 18*x*, and the red light 91*r* is emitted only upward from the polarizing modulation cell 18*y*. As a result, only the red light 91*r* enters the red sub-pixel 85R, only the green light 91*g* enters the gree sub-pixel 85G, and only the blue light 91*b* enters the blue sub-pixel 85B in the color filter 85.

Figure 22:
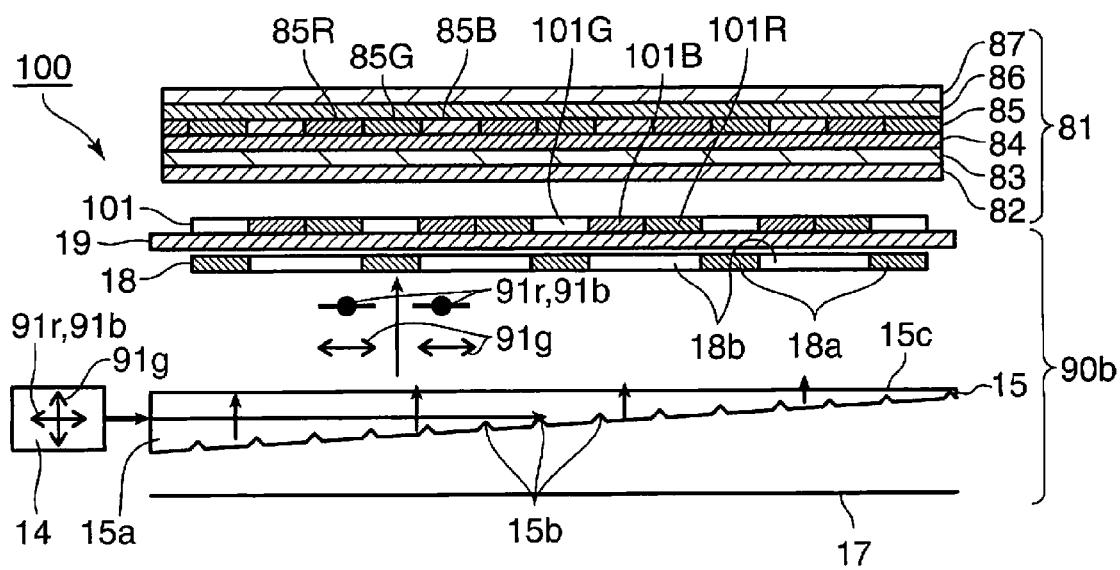
FIG. 22 is a cross-sectional view depicting another liquid crystal display according to Embodiment 3 of the present invention.

By this configuration, the loss of light in the color filter, which occurs in conventional liquid crystal displays can be prevented in the liquid crystal display 120 shown in FIG. 24, just like the liquid crystal display 100 shown in FIG. 22, so the light utilization efficiency can be improved three times compared with the prior art, and a liquid crystal display of which light utilization efficiency is high can be constructed. Further, a light emitted from each light source selectively enters a sub-filter by polarization, as mentioned above, therefore the light separation characteristic is high when an LED is used for the light source, even if the incident angle, with respect to the polarizing modulation plate 18 or the polarizing filter 19, is dispersed or if the wavelength is dispersed, and a liquid crystal display of which light utilization efficiency is high can be constructed.

Here a method for separating lights having the same polarizing directions (the red light 91*r* and blue light 91*b* in this case) was described using the liquid crystal display 100 and the liquid crystal display 120, but other methods may be used only if the lights having the same polarizing directions (the red light 91*r* and blue light 91*b* in this case) can be separated.

Just like the case of the present liquid crystal display 80, and the liquid crystal displays 100, 110 and 120, there may be gaps between the surface illumination apparatus 90 (90*a*, 90*b*, 90*c*, 90*d*) and the liquid crystal display panel 81, or between the polarizing filter 19 and the polarizing modulation plate 18, or there may be no gap there between. If there is no gap, the distance from the polarizing modulation plate 18 to the color filter 85 (sub-pixels 85R, 85G and 85B) decreases, so the loss of light due to the spread of light during propagation from the polarizing modulation plate 18 to the color filter 85 can be decreased, which is preferable.

In the case of the present liquid crystal display 80, and the liquid crystal displays 100, 110 and 120 as well, the spread of the light from the polarizing modulation plate 18 or wavelength filter 101 to the color filter 85 can be suppressed by using a laser light source or SLD for the light source, and therefore light utilization efficiency can be increased, and a high quality image with a wide color reproduction range can be displayed. For certain, as described for the surface illumination apparatus 10 of Embodiment 1, an LED may be used for the light source, or other light sources may be used as well.

In all of the liquid crystal displays 80, 100, 110 and 120 according to the present embodiment, a system including the ½ wavelength plate is used for the polarizing modulation cell constituting the polarizing modulation plate, just like the surface illumination apparatus 10 described in Embodiment 1, but a system including the ¼ wavelength plate may be used for the polarizing modulation cell constituting the polarizing modulation plate, just like the surface illumination apparatus 50 described in Embodiment 2.

For example, it is acceptable that in the liquid crystal display 120 shown in FIG. 24, a ¼ wavelength plate 53 is inserted between the combiner 13 and the light guiding bar 14, a ¼ wavelength plate 59 is inserted between the light guiding plate 15 and the reflection sheet 17, and a polarizing modulation plate constituted by a first to third polarizing modulation cells, which function as ¼ wavelength plates having mutually different wavelength characteristics, instead of the polarizing modulation plate 18, is disposed between the light guiding plate 15 and the polarizing filter 19, just like the surface illumination apparatus shown in FIG. 12. Here it is assumed that the first polarizing modulation cell is disposed in the position of the polarizing modulation cell 18*y*, the second polarizing modulation cell is disposed in the position of the polarizing modulation cell 18*x*, and the third polarizing modulation cell is disposed in the position of the polarizing modulation cell 18*a*.

In this case, two types of rotatory polarized lights (e.g. red light and green light) of which rotating directions of polarization are mutually opposite, and a rotatory polarized light (e.g. blue light) of which rotating direction is the same as one of the two types of rotatory polarized lights (e.g. red light), enter through the side face 15*a* of the light guiding plate 15 and emit through the principal plane 15*c*, and out of these three rotatory polarized lights, the third rotatory polarized light (e.g. green light) having an opposite polarizing direction becomes the third light having a polarizing direction to transmit through the third polarizing modulation cell, which functions as a ¼ wavelength plate with respect to the wavelengths of the three rotatory polarized lights and transmit through the polarizing filter 19, and is emitted outside through the polarizing filter 19. The first and second rotatory polarized lights (e.g. red light and blue light) having a same rotating direction, on the other hand, transmit through the third polarizing modulation cell and become lights having a polarizing direction so as to be reflected by the polarizing filter, and is reflected to the inside by the polarizing filter 19.

The first rotatory polarized light (e.g red light) becomes a light having a polarizing direction to transmit through the second polarizing modulation cell which functions as a ¼ wavelength plate of which directions of the slow axis and the fast axis are different from the third polarizing modulation cell with respect only to the wavelength of the first rotatable polarized light, and to be reflected by the polarizing filter 19, and is reflected to the inside by the polarizing filter 19. The second rotatory polarized light (e.g. blue light), on the other hand, becomes a second light having a polarizing direction to transmit through the second polarizing modulation cell and to transmit through the polarizing filter 19, and is emitted to the outside through the polarizing filter 19.

The second rotatory polarized light (e.g. blue light) also becomes a light having a polarizing direction to transmit through the first polarizing modulation cell which functions as a ¼ wavelength plate of which directions of the slow axis and the fast axis are different from the third polarizing modulation cell with respect only to the wavelength of the second rotatable polarized light, and to be reflected by the polarizing filter 19, and is reflected to the inside by the polarizing filter 19. The first rotatory polarized light (e.g. red light), on the other hand, becomes a first light having a polarizing direction to transmit through the first polarizing modulation cell and to transmit through the polarizing filter 19, and is emitted to the outside through the polarizing filter 19.

Therefore the first rotatory polarized light (e.g. red light) enters the red sub-pixel 85R only through the first polarizing modulation cell, the second rotatory polarized light (e.g. blue light) enters the blue sub-pixel 85B only through the second polarizing modulation cell, and the third rotatable polarized light (e.g. green light) enters the green sub-pixel 85G only via the third polarizing modulation cell, so a similar effect as above can be obtained by using the system including the ¼ plates.

Embodiment 4

Figure 25:
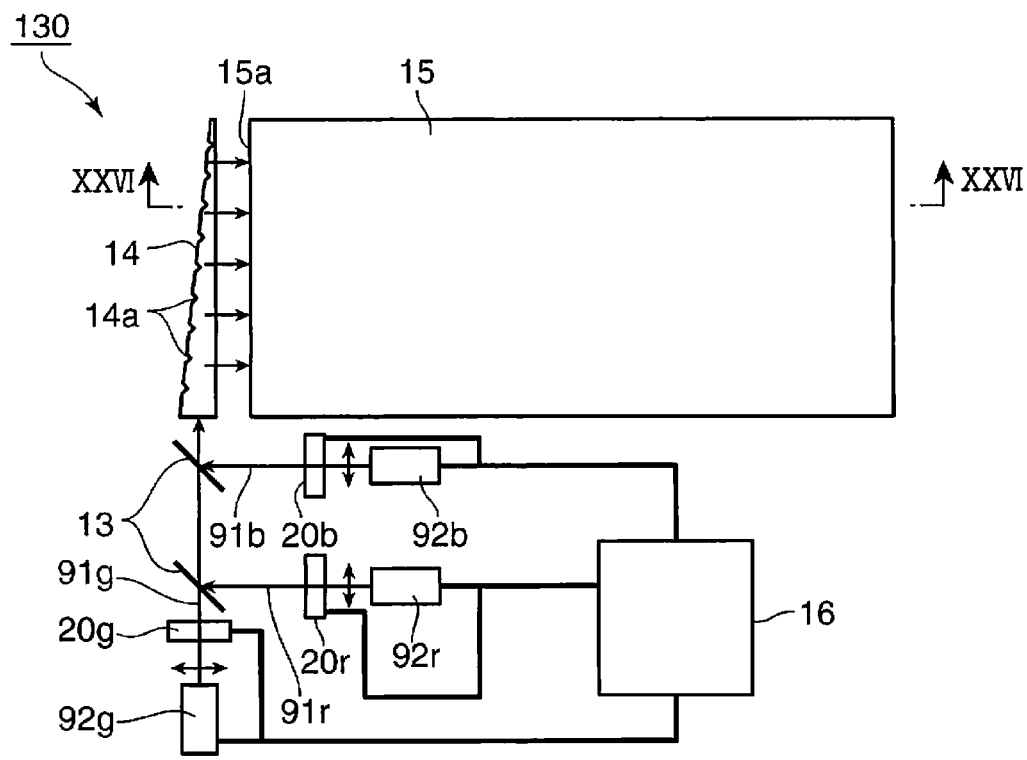
FIG. 25 is a top view depicting a liquid crystal display according to Embodiment 4 of the present invention.

A liquid crystal display 130 according to Embodiment 4 will now be described with reference to FIG. 25 and FIG. 26. FIG. 25 is a top view of the liquid crystal display 130, excluding the liquid crystal panel 81, polarizing filter 19, polarizing modulation plate 18 and reflection sheet 17, and FIG. 26 is a cross-sectional view of the liquid crystal display 130 sectioned at the XXVI-XXVI line in FIG. 25.

A surface illumination apparatus 90e constituting the present liquid crystal display 130 is similar to the surface illumination apparatus 10, and the surface illumination apparatus 40 of Embodiment 1, but the difference is the pitch of the modulation cells comprised of the polarizing modulation cell 18a and the non-modulation cell 18b constituting the polarizing modulation plate 18. In other words, when sub-pixels 85R, 85G and 85B, constituting the color filter 85 in the liquid crystal panel, are regarded as one pixel, the pitch of the modulation cells constituted by the polarizing modulation cell 18a and the non-modulation cell 18b is the same as the pitch of the pixel, when one pixel of the color filter is regarded as one unit, and the polarizing modulation cell 18a and the non-modulation cell 18b are arrayed alternatively. In other words, the length of one side of the polarizing modulation cell 18a, which is a modulation cell, and that of the non-modulation cell 18b, which is a modulation cell, are set to be the same as the total of the length of one side of three sub-pixels 85R, 85G and 85B of the color filter 85, and are set to be an integral multiple (e.g. three times) of the length of one side of each sub-pixel 85R, 85G and 85B.

In this liquid crystal display 130, the red light 91r, green light 91g and blue light 91b, which emit from each light source 92r, 92g and 92b and then emit through the ½ wavelength plates 20r, 20g and 20b, are multiplexed by the combiner 13. Here it is assumed that the control unit 16 controls the ½ wavelength plates 20r, 20g and 20b, and polarizes the red light 91r, green light 91g and blue light 91b, which are multiplexed and enter the light guiding bar 14, all in the horizontal direction on the page face.

Figure 26:
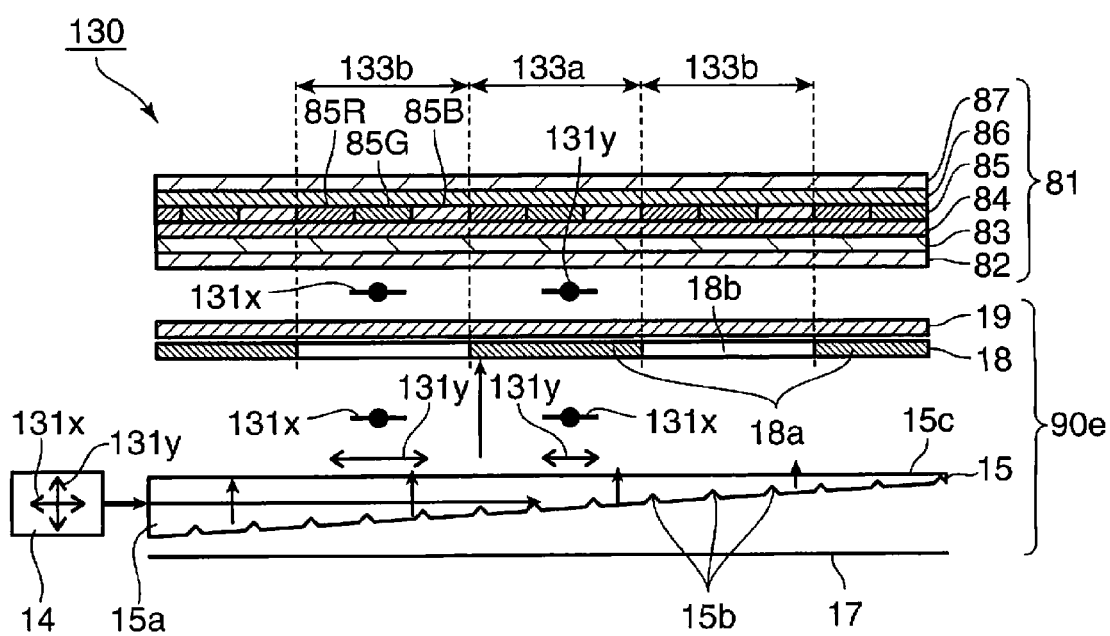
FIG. 26 is a cross-sectional view of the surface illumination apparatus sectioned at the XXVI-XXVI line shown in FIG. 25.

To assist in understanding in FIG. 26, the light which enters the light guiding bar 14, while being polarized in the horizontal direction on the page face, is the light 131x, and the light which enters the light guiding bar 14, while being polarized in the vertical direction on the page face and which intersects orthogonally with the light 131x, is the light 131y. In other words, the red light 91r, green light 91g and blue light 91b are all polarized in the same direction as the light 131x. Just like the surface illumination apparatus 10 of Embodiment 1, the polarizing modulation cell 18a functions as the ½ wavelength plate, and the non-modulation cell 18b modulates no polarized lights. The polarizing filter 19 has a function to reflect a light of which polarizing direction is the horizontal direction on the page face, and to transmit a light of which polarizing direction is a direction perpendicular to the page face, just like the previously described embodiments.

Just like the surface illumination apparatus 10 of Embodiment 1, if the light 131x transmits through the polarizing modulation cell 18a, which functions as the ½ wavelength plate, in this state, the light 131x is reflected by the polarizing filter 19 and performs multiple reflection between the polarizing filter 19 and the reflection sheet 17 until reaching the non-modulation cell 18b. If the light 131x enters the non-modulation cell 18b, the light 131x transmits through the polarizing filter 19, just like the surface illumination apparatus 10, and emits upward on the page face from the surface illumination apparatus 90e. Hence the red light 91r, green light 91g and blue light 91b of the light 131x are emitted only upward from the non-modulation cell 18b of the polarizing filter 19.

If the control unit 16 controls the ½ wavelength plates 20r, 20g and 20b so as to polarize the polarizing directions of the red light 91r, green light 91g and blue light 91b, which are multiplexed and enter the light guiding bar 14, in the vertical direction on the page face, then the light 131y enters the light guiding bar 14, and the red light 91r, green light 91g and blue light 91b of the light 131y are emitted only upward from the polarizing modulation cell 18a of the polarizing filter 19.

Figure 27:
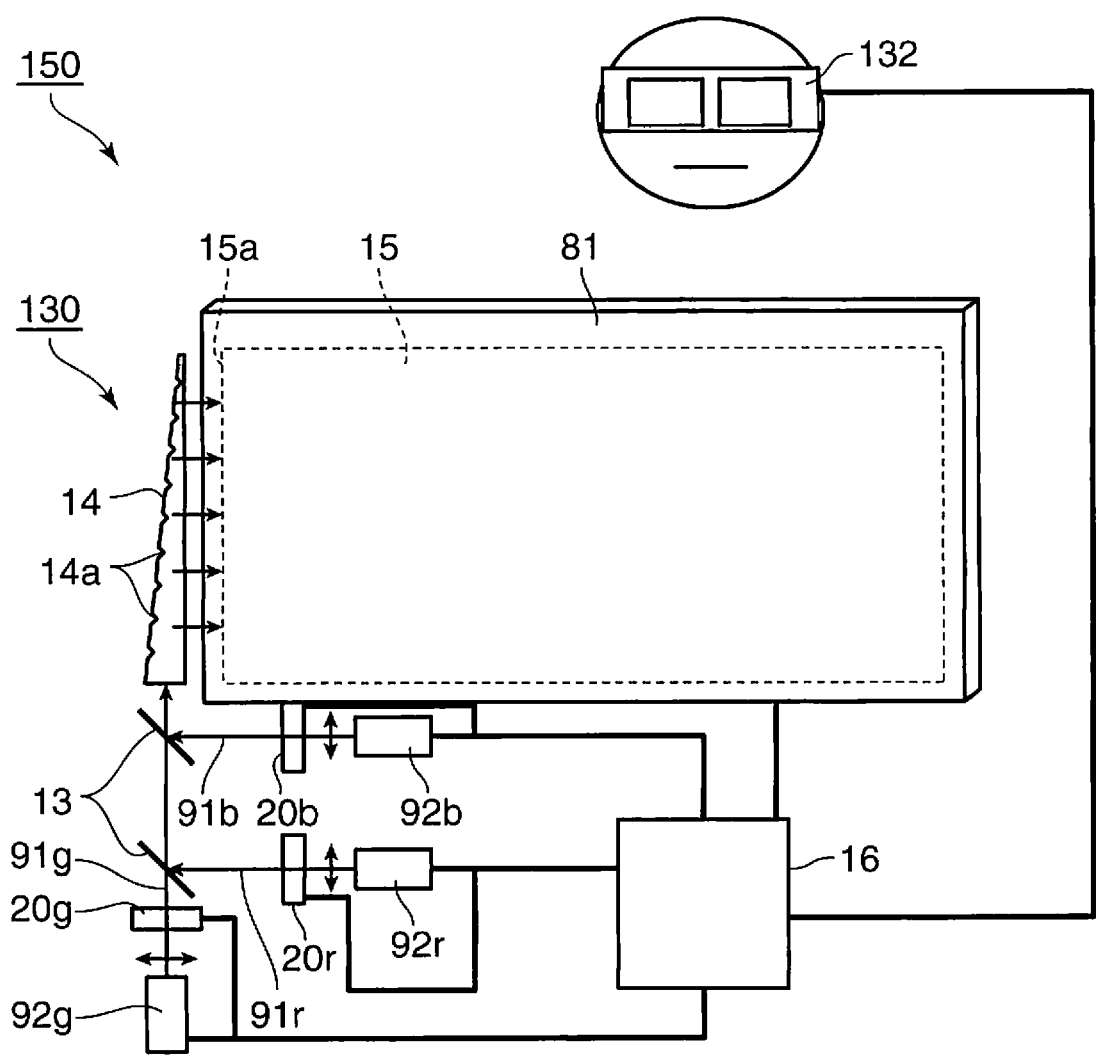
FIG. 27 is a diagram depicting a configuration of a three-dimensional liquid crystal display according to Embodiment 4 of the present invention.

If the liquid crystal display 130 constructed like this is used, a three-dimensional liquid crystal display 150 that can display three-dimensional images, as shown in FIG. 27, can be implemented. As shown in FIG. 27, the liquid crystal panel 81 and shutter glasses 132 are connected to the control unit 16. The shutter glasses 132 has shutters in the lens portions of ordinary glasses, so that the left and right lenses can be independently opened/closed at an arbitrary timing by the control unit 16. In FIG. 27, the control unit 16 and the shutter glasses 132 are directly wired, but can be wirelessly controlled with certainty.

Now the mechanism of the operation of the three-dimensional liquid crystal display 150 will be described. Here as FIG. 26 shows, it is assumed that a pixel 133b of the liquid crystal panel 81, which exists directly above the non-modulation cell 18b, displays an image for the left eye, and the pixel 133a of the liquid crystal panel 81, which exists directly above the polarizing modulation cell 18a, displays an image for the right eye.

In concrete terms, in the state of each light source 92r, 92g and 92b being lit, and an image for the left eye and an image for the right eye being displayed on the liquid crystal panel 81, the control unit 16 polarizes the polarizing directions of the red light 91r, green light 91g and blue light 91b in the direction of the light 131x in FIG. 26 by controlling the ½ wavelength plates 20r, 20g and 20b at a predetermined timing.

Then the control unit 16 opens the left eye shutter and closes the right eye shutter of the shutter glasses 132 at the same timing. By this, only the image for the left eye, displayed on the liquid crystal panel, is viewed by the left eye.

Then the control unit 16 polarizes the polarizing directions of the red light 91*r*, green light 91*g* and blue light 91*b* in the direction of the light 131*y* in FIG. 26 by controlling the ½ wavelength plates 20*r*, 20*g* and 20*b* at a predetermined timing. Then the control unit 16 opens the right eye shutter and closes the left eye shutter of the shutter glasses 132 at the same timing. By this, only the image for the right eye, displayed on the liquid crystal panel, is viewed by the right eye.

By the above operation, the viewer can recognize the image displayed on the liquid crystal panel 81 as a three-dimensional image. Then the next frame image is displayed on the liquid crystal panel 81, and the three-dimensional moving picture can be viewed by repeating the above operation. By constructing like this, light does not enter the pixel 133*b* corresponding to the image for the left eye while the image for the right eye is being displayed, for example, so a highly efficient three-dimensional liquid crystal display, without loss of light, can be constructed.

Instead of alternatively switching the image for the left eye and the image for the right eye in one frame period, as in the case of a liquid crystal panel of an ordinary three-dimensional display, a state of writing the image for the left eye to the pixel 133*b* and writing the image for the right eye to the pixel 133*a* can be maintained during one frame period, so a good three-dimensional image without cross-talk can be displayed even if a liquid crystal panel, of which response characteristic is slow, is used as the liquid crystal panel 81. If a lenticular lens is formed on the pixel 133*b* of the liquid crystal panel 81, so as to guide the image for the left eye to the left eye of the viewer, and at the same time, a lenticular lens is formed on the pixel 133*a*, so as to guide the image for the right eye to the right eye of the viewer, then the viewer can view the three-dimensional image without using shutter glasses.

In this three-dimensional liquid crystal display 150 as well, a high quality image with a wide color reproduction range can be displayed by using a laser beam for the light source. Needless to say, an LED or an SLD can also be used for the light source, as described for the surface illumination apparatus 10 of Embodiment 1, or other light sources may be used instead.

The three-dimensional liquid crystal display 150 according to the present embodiment uses a system including the ½ wavelength plate as the polarizing modulation cell constituting the polarizing modulation plate, just like the surface illumination apparatus 10 described in Embodiment 1, but a system including the ¼ wavelength plate may be used as the polarizing modulation cell constituting the polarizing modulation plate, just like the surface illumination apparatus 50 described in Embodiment 2.

The configuration shown in each embodiment is an example, and numerous modifications can be made without departing from the spirit and scope of the invention. It is certainly possible to combine each embodiment described above and a variant form of these embodiments.

Based on each embodiment mentioned above, the present invention can be summarized as follows. A surface illumination apparatus according to the present invention comprises: a plurality of light sources which emit lights; a light guiding plate which allows the lights emitted from the light sources to enter through one of the side faces and emits the lights through one principal plane; a polarizing filter which transmits lights in a predetermined polarizing direction and reflects lights in a polarizing direction perpendicular to the predetermined polarizing direction; a polarizing modulation plate which performs predetermined modulation on the polarizing characteristics of the incident lights; and a reflection sheet which regularly reflects the incident lights, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from the plurality of light sources include linearly polarized lights of which polarizing directions are perpendicular to each other in a stage of the lights entering the light guiding plate, and the polarizing modulation plate comprises a polarizing modulation cell which functions as a ½ wavelength plate, and a non-modulation cell which does not modulate the polarizing characteristics.

In this surface illumination apparatus, two types of linearly polarized lights, of which polarizing directions are perpendicular to each other, enter through the side face of the light guiding plate and emit through one of the principal planes, and of these two types of lights, the first light having a polarizing direction to transmit through the polarizing filter transmits through the non-modulation cell and the polarizing filter and is emitted to the outside, and the second light having a polarizing direction to be reflected by the polarizing filter transmits through the non-modulation cell, and then is reflected to the inside by the polarizing filter.

When the first and second lights transmit through the polarizing modulation cells that function as ½ wavelength plates, the polarizing directions of the first and second lights are changed so that the first light becomes the second light and is reflected to the inside by the polarizing filter, and the second light becomes the first light and transmits through the polarizing filter and is emitted outside.

Therefore the first light is emitted to the outside only through the non-modulation cell, and the second light is emitted to the outside only through the polarizing modulation cell, so a surface illumination apparatus with which an arbitrary area can be selectively illuminated by an extremely simple optical system configuration, and lighting areas can be easily switched, can be constructed easily at low cost.

Another surface illumination apparatus according to the present invention comprises: a light source which emits light; a light guiding plate which allows the light emitted from the light source to enter through one of the side faces and emits the light through one principal plane; a polarizing filter which transmits light in a predetermined polarizing direction and reflects light in a polarizing direction perpendicular to the predetermined polarizing direction; a polarizing modulation plate which performs predetermined modulation on the polarizing characteristics of the incident light; and a reflection sheet which regularly reflects the incident light, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, the light emitted from the light source includes linearly polarized light of which polarizing direction can be switched at an arbitrary timing in a stage of the light entering the light guiding plate, and the polarizing modulation plate comprises a polarizing modulation cell which functions as a ½ wavelength plate, and a non-modulation cell which does not modulate the polarizing characteristics.

In this surface illumination apparatus, the linearly polarized light of which polarizing direction can be switched at an arbitrary timing enters through the side face of the light guiding plate and is emitted through one principal plane, so while the first light having a polarizing direction to transmit through the polarizing filter is being entered, the first light transmits through the non-modulation cell and the polarizing filter, and is emitted outside, and while the second light, having a polarizing direction to be reflected by the polarizing filter, is being entered, the second light transmits through the non-modulation cell and is then reflected to the inside by the polarizing filter.

When the first or second light transmits through the polarizing modulation cell which functions as the ½ wavelength plate, the polarizing direction thereof is changed, so that the first light becomes the second light and is reflected to the inside by the polarizing filter, and the second light becomes the first light and transmits through the polarizing filter and is emitted outside.

Therefore when the first light is being entered, the first light is emitted outside only through the non-modulation cell, and when the second light is being entered, the second light is emitted outside only through the polarizing modulation cell, so a surface illumination apparatus, with which an arbitrary area can be selectively illuminated by an extremely simple optical system configuration and lighting areas can be easily switched, can be constructed easily at low cost. Since a single light source is used and there is no need to provide a lighting circuit independently for each polarizing modulation cell and non-modulation cell, the surface illumination apparatus can be manufactured at even lower cost.

Another surface illumination apparatus according to the present invention comprises: at least three light sources which emit lights having mutually different wavelengths; a light guiding plate which allows lights emitted from the light sources to enter through one of the side faces and emits the lights through one principal plane; a polarizing filter which transmits lights in a predetermined polarizing direction and reflects lights in a polarizing direction perpendicular to the predetermined polarizing direction; a polarizing modulation plate which performs predetermined modulation on the polarizing characteristics of the incident lights; and a reflection sheet which regularly reflects the incident lights, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from at least three light sources include linearly polarizing lights of which polarizing directions are perpendicular to each other in a stage of the lights entering the light guiding plate, and the polarizing modulation plate comprises at least three types of polarizing modulation cells which function as ½ wavelength plates having mutually different wavelength characteristics.

In this surface illumination apparatus, two types of linearly polarized lights, of which polarizing directions are perpendicular to each other and a linearly polarized light having a same polarizing direction as one of the two types of linearly polarized lights, from at least three light sources, enter through the side face of the light guiding plate, and are emitted through one principal plane, and the polarizing directions of the first and second lights having polarizing directions to transmit through the polarizing filter, out of the three lights, are changed when the first and second lights transmit through the third polarizing modulation cell which functions as the ½ wavelength plate for the wavelengths of the three lights, and these first and second lights are reflected to the inside by the polarizing filter, and the polarizing direction of the third light having a polarizing direction to be reflected by the polarizing filter, on the other hand, is changed when the third light transmits through the third polarizing modulation cell, and the third light transmits through the polarizing filter and is emitted outside.

When the first light transmits through the second polarizing modulation cell, which functions as a ½ wavelength plate only for a wavelength of the first light, the polarizing direction thereof is changed and the first light is reflected to the inside by the polarizing filter, and when the second light transmits through the second polarizing modulation cell, on the other hand, the polarizing direction thereof is not changed and the second light transmits through the polarizing filter and is emitted outside.

When the second light transmits through the first polarizing modulation cell, which functions as a ½ wavelength plate only for a wavelength of the second light, the polarizing direction thereof is changed and the second light is reflected to the inside by the polarizing filter, and when the first light transmits through the first polarizing modulation cell, on the other hand, the polarizing direction thereof is not changed and the first light transmits through the polarizing filter and is emitted outside.

Therefore the first light is emitted outside only through the first polarizing modulation cell which functions as a ½ wavelength plate only for the second light, the second light is emitted outside only through the second polarizing modulation cell which functions as a ½ wavelength plate only for the first light, and the third light is emitted to the outside only through the third polarizing modulation cell which functions as a ½ wavelength plate for the three lights, so a surface illumination apparatus, with which an arbitrary area can be selectively illuminated by an extremely simple optical system configuration and lighting areas can be easily switched, can be constructed easily at low cost.

Another surface illumination apparatus according to the present invention comprises: a plurality of light sources which emit lights; a light guiding plate which allows the lights emitted from the light sources to enter through one of the side faces and emits the lights through one principal plane; a polarizing filter which transmits lights in a predetermined polarizing direction and reflects lights in a polarizing direction perpendicular to the predetermined polarizing direction; a polarizing modulation plate which includes a polarizing modulation cell for performing predetermined modulation on the polarizing characteristics of the incident lights; and a reflection sheet which regularly reflects the incident lights, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from the plurality of light sources include rotatory polarized lights of which rotating directions of polarization are opposite from each other in a stage of the lights entering the light guiding plate, and the polarizing modulation plate comprises a plurality of types of polarizing modulation cells which function as ¼ wavelength plates having mutually different directions of a slow axis and fast axis.

In this surface illumination apparatus, two types of rotatory polarized lights, of which rotating directions of polarization are opposite from each other, enter through the side face of the light guiding plate and are emitted through one principal plane, and the first rotatory polarized light out of the two types of rotatory polarized lights emitted transmits through the first polarizing modulation cell, out of the first and second polarizing modulation cells which function as ¼ wavelength plates of which directions of the slow axis and fast axis are mutually different, and becomes the first light having a polarizing direction to transmit through the polarizing filter and is emitted outside through the polarizing filter, and the second rotatory polarized light, on the other hand, transmits through the first polarizing modulation cell and becomes the second light having a polarizing direction to be reflected by the polarizing filter and is reflected to the inside by the polarizing filter.

The second rotatory polarized light also transmits through the second polarizing modulation cell and becomes the first light having a polarizing direction to transmit through the polarizing filter and is emitted outside through the polarizing filter, and the first rotatory polarized light, on the other hand, transmits through the second polarizing modulation cell and becomes the second light having a polarizing direction to be reflected by the polarizing filter and is reflected to the inside by the polarizing filter.

Therefore the first rotatory polarized light is emitted outside only via the first polarizing modulation cell, and the second rotatory polarized light is emitted outside only via the second polarizing modulation cell, so a surface illumination apparatus, with which an arbitrary area can be selectively illuminated by an extremely simple optical system configuration and lighting areas can be easily switched, can be constructed easily and at low cost.

Another surface illumination apparatus according to the present invention comprises: a light source which emits light; a light guiding plate which allows the light emitted from the light source to enter through one of the side faces and emits the light through one principal plane; a polarizing filter which transmits light in a predetermined polarizing direction and reflects light in a polarizing direction perpendicular to the predetermined polarizing direction; a polarizing modulation plate which performs predetermined modulation on the polarizing characteristics of the incident light; and a reflection sheet which regularly reflects the incident light, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, the light emitted from the light source includes rotatory polarized light of which rotating direction of polarization can be switched at an arbitrary timing in a stage of the light entering the light guiding plate, and the polarizing modulation plate comprises a plurality of types of polarizing modulation cells which function as ¼ wavelength plates having mutually different directions of a slow axis and fast axis.

In this surface illumination apparatus, the rotatory polarized light, of which polarizing direction can be switched at an arbitrary timing, enters through the side face of the light guiding plate and is emitted through one principal plane, so two types of rotatory polarized lights, of which rotating directions of polarization are opposite from each other, can be selectively emitted at an arbitrary timing.

At this time, the first rotatory polarized light, out of the two types of rotatory polarized lights emitted, transmits through the first polarizing modulation cell, out of the first and second polarizing modulation cells which functions as the ¼ wavelength plates of which directions of the slow axis and fast axis are mutually different, and becomes the first light having a polarizing direction to transmit through the polarizing filter and is emitted outside through the polarizing filter, and the second rotatory polarized light, on the other hand, transmits through the first polarizing modulation cell and becomes the second light having a polarizing direction to be reflected by the polarizing filter and is reflected to the inside by the polarizing filter.

The second rotatory polarized light also transmits through the second polarizing modulation cell and becomes the first light having a polarizing direction to transmit through the polarizing filter and is emitted outside through the polarizing filter, and the first rotatory polarized light, on the other hand, transmits through the second polarizing modulation cell and becomes the second light having a polarizing direction to be reflected by the polarizing filter and is reflected to the outside by the polarizing filter.

Therefore the first rotatory polarized light is emitted outside only through the first polarizing modulation cell, and the second rotatory polarized light is emitted outside only through the second polarizing modulation cell, so a surface illumination apparatus, with which an arbitrary area can be selectively illuminated by an extremely simple optical system configuration and lighting areas can be easily switched, can be constructed easily at low cost. Since a single light source is used and there is no need to provide a lighting circuit independently for each of the first and second polarizing modulation cells, the surface illumination apparatus can be manufactured at low cost.

Another surface illumination apparatus according to the present invention comprises: at least three light sources which emit lights having mutually different wavelengths; a light guiding plate which allows lights emitted from the light sources to enter through one of the side faces and emits the lights through one principal plane; a polarizing filter which transmits lights in a predetermined polarizing direction and reflects lights in a polarizing direction perpendicular to the predetermined polarizing direction; a polarizing modulation plate which performs predetermined modulation on the polarizing characteristics of the incident lights; and a reflection sheet which regularly reflects the incident lights, wherein the polarizing filter and the polarizing modulation plate are disposed near the one principal plane of the light guiding plate, in order of the polarizing modulation plate and the polarizing filter from the light guiding plate side, the reflection sheet is disposed near the other principal plane of the light guiding plate on the opposite side to the one principal plane, at least two out of the lights emitted from the at least three light sources include rotatory polarized lights of which rotating directions of polarization are opposite from each other in a stage of the lights entering the light guiding plate, and the polarizing modulation plate comprises at least three types of polarizing modulation cells which function as ¼ wavelength plates having mutually different wavelength characteristics.

In this surface illumination apparatus, two types of rotatory polarized lights, of which rotating directions of polarization are opposite from each other, and a rotatory polarized light having a same rotating direction as one of the two types of rotatory polarized lights, enter through the side face of the light guiding plate, and are emitted through one principal plane, and the third rotatory polarized light having an opposite polarizing direction, out of the three rotatory polarized lights, transmits through the third polarizing modulation cell, which functions as a ¼ wavelength plate for the wavelengths of the three rotatory polarized lights, and becomes the third light having a polarizing direction to transmit through the polarizing filter and is emitted outside through the polarizing filter, and the first and second rotatory polarized lights having the same rotating direction transmits through the third polarizing modulation cell and becomes a light having a polarizing direction to be reflected by the polarizing filter and is reflected to the inside by the polarizing filter.

The first rotary polarized light transmits through the second polarizing modulation cell which functions as a ¼ wavelength plate of which directions of the slow axis and fast axis are different from the third polarizing modulation cell only for the wavelength of the first rotary polarized light and becomes a light having a polarizing direction to be reflected by the polarizing filter and is reflected to the inside by the polarizing filter, and the second rotary polarized light, on the other hand, transmits through the second polarizing modulation cell and becomes the second light having a polarizing direction to transmit through the polarizing filter and is emitted outside through the polarizing filter.

The second rotary polarized light transmits through the first polarizing modulation cell, which functions as a ¼ wavelength plate of which directions of the slow axis and fast axis are different from the third polarizing modulation cell only for the wavelength of the second rotary polarizing light and becomes a light having a polarizing direction to be reflected by the polarizing filter and is reflected to the inside by the polarizing filter, and the first rotary polarized light transmits through the first polarizing modulation cell and becomes the first light having a polarizing direction to transmit through the polarizing filter and is emitted outside through the polarizing filter.

Therefore the first rotary polarized light is emitted outside only through the first polarizing modulation cell, the second rotary polarized light is emitted outside only through the second polarizing modulation cell, and the third rotary polarized light is emitted outside only through the third polarizing modulation cell, so a surface illumination apparatus, with which an arbitrary area can be selectively illuminated by an extremely simple optical system configuration and lighting areas can be easily switched, can be constructed easily at low cost.

It is preferable that the plurality of light sources include two light sources which emit lights having mutually different wavelengths. In this case, an arbitrary area can be selectively illuminated using two lights having different wavelengths, and the lighting areas can be easily switched.

It is preferable that the plurality of light sources include at least three light sources which emit lights having mutually different wavelengths, a wavelength filter including a plurality of sub-filters which are disposed at the opposite side of the polarizing modulation plate with respect to the polarizing filter and have mutually different filter characteristics, is further included, and the plurality of sub-filters include a sub-filter which transmits light having a predetermined wavelength, and reflects at least a part of lights not having the predetermined wavelength.

In this case, three lights having different wavelengths can be separated by a plurality of sub-filters and emitted, so the light utilization efficiency can be improved if this surface illumination apparatus is used for the liquid crystal display.

It is preferable that the three light sources include a blue light source which emits a blue light, a green light source which emits a green light, and a red light source which emits a red light, the polarizing modulation plate and the polarizing filter separate the green light, and the wavelength filter separates the blue light and the red light.

In this case, the light separated by the polarizing modulation plate and the polarizing filter can be a green light, which has an intermediate wavelength among the three colors, and the lights separated by the wavelength filter can be the blue light and the red light, so the wavelength range available for switching the transmission characteristic and the reflection characteristic in the wavelength filter increases, and it is unnecessary to provide a sharp characteristic to each sub-filter of the wavelength filter, so the wavelength filter can be easily manufactured at low cost.

It is preferable that the polarizing modulation cell arbitrarily and dynamically adjusts a polarizing modulation amount in an arbitrary area for incident lights. In this case, the pattern form to be illuminated can be arbitrarily and dynamically changed.

It is preferable that the three light sources include a blue light source which emits light having a central wavelength of 400 to 490 nm, a green light source which emits light having a central wavelength of 490 to 570 nm, and a red light source which emits light having a central wavelength of 570 to 680 nm.

In this case, a display target area can be lit with an arbitrary color by simultaneously turning each light source ON with predetermined light quantities.

It is preferable that the light source includes a laser light source. In this caser, the color purity of the light source becomes extremely high, so a very wide color range can be displayed.

The light source may include a super-luminescent diode. In this case, the wavelength width of the light source increases and speckle noise is suppressed, so a surface illumination apparatus that allows easier visual recognition of images can be constructed.

The light source may include a light emitting diode. In this case, the cost of the apparatus can be decreased.

A liquid crystal display of the present invention comprises: a liquid crystal panel; and the above mentioned surface illumination apparatus, which illuminates the liquid crystal panel from the rear face, wherein the liquid crystal panel has a color filter therein, and is disposed at the opposite side of the polarizing modulation plate with respect to the polarizing filter.

In the liquid crystal display, a surface illumination apparatus, which can selectively illuminate an arbitrary area by an extremely simple optical system configuration, is used, so a liquid crystal display, of which light utilization efficiency is high and power consumption is low, can be constructed using a simple configuration at low cost.

It is preferable that the polarizing modulation plate includes a plurality of modulation cells which are arrayed in a matrix, and the length of one side of each of the modulation cells is the same as or an integral multiple of the length of one side of a sub-pixel of the color filter.

In this case, only the light having a corresponding color can be entered to the color filter having a corresponding color directly upward from each modulation cell, so the light utilization efficiency can be improved, and if a light quantity is obtained with a same brightness, energy to be used can be decreased, and power consumption can be reduced.

It is preferable that the liquid crystal display further comprises a reflection coat which is disposed in a boundary area between the modulation cells and reflects the incident light toward the light guiding plate side.

In this case, all the lights that enter the reflection coat can be reflected to the inside, so if a black matrix is formed on boundaries of each sub-pixel of the color filter, an unnecessary absorption of lights by the black matrix can be prevented, and the light utilization efficiency can be further increased.

INDUSTRIAL APPLICABILITY

The surface illumination apparatus of the present invention can control the area of the light emitted from the surface illumination apparatus by a simple optical system configuration, so an inexpensive surface illumination apparatus can be provided. Since the corresponding color of light can be separately entered to each sub-pixel of the liquid crystal panel with a simple configuration by constructing the liquid crystal display using the surface illumination apparatus of the present invention, a liquid crystal display which has low cost, high light utilization efficiency and low power consumption can be implemented. Therefore the surface illumination apparatus of the present invention and the liquid crystal display using this apparatus can be applied to illumination apparatuses and displays in general, and is useful.

The invention claimed is:

1. A surface illumination apparatus, comprising:
a plurality of light sources which emit lights;
a light guiding plate which allows the lights emitted from the light sources to enter through one of the side faces and emits the lights through one principal plane;
a polarizing filter which transmits lights in a predetermined polarizing direction and reflects lights in a polarizing direction perpendicular to the predetermined polarizing direction;
a polarizing modulation plate which performs predetermined modulation on the polarizing characteristics of the incident lights; and
a reflection sheet which regularly reflects the incident lights, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
at least two out of the lights emitted from the plurality of light sources include linearly polarized lights of which polarizing directions are perpendicular to each other in a stage of the lights entering the light guiding plate, and
the polarizing modulation plate comprises a polarizing modulation cell which functions as a ½ wavelength plate, and a non-modulation cell which does not modulate the polarizing characteristics.

2. A surface illumination apparatus, comprising:
a light source which emits light;
a light guiding plate which allows the light emitted from the light source to enter through one of the side faces and emits the light through one principal plane;
a polarizing filter which transmits light in a predetermined polarizing direction and reflects light in a polarizing direction perpendicular to the predetermined polarizing direction;
a polarizing modulation plate which performs predetermined modulation on the polarizing characteristics of the incident light; and
a reflection sheet which regularly reflects the incident light, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
the light emitted from the light source includes linearly polarized light of which polarizing direction can be switched at an arbitrary timing in a stage of the light entering the light guiding plate, and
the polarizing modulation plate comprises a polarizing modulation cell which functions as a ½ wavelength plate, and a non-modulation cell which does not modulate the polarizing characteristics.

3. A surface illumination apparatus, comprising:
at least three light sources which emit lights having mutually different wavelengths;
a light guiding plate which allows lights emitted from the light sources to enter through one of the side faces and emits the lights through one principal plane;
a polarizing filter which transmits lights in a predetermined polarizing direction and reflects lights in a polarizing direction perpendicular to the predetermined polarizing direction;
a polarizing modulation plate which performs predetermined modulation on the polarizing characteristics of the incident lights; and
a reflection sheet which regularly reflects the incident lights, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
at least two out of the lights emitted from the at least three light sources include linearly polarizing lights of which polarizing directions are perpendicular to each other in a stage of the lights entering the light guiding plate, and
the polarizing modulation plate comprises at least three types of polarizing modulation cells which function as ½ wavelength plates having mutually different wavelength characteristics.

4. A surface illumination apparatus, comprising:
a plurality of light sources which emit lights;
a light guiding plate which allows the lights emitted from the light sources to enter through one of the side faces and emits the lights through one principal plane;
a polarizing filter which transmits lights in a predetermined polarizing direction and reflects lights in a polarizing direction perpendicular to the predetermined polarizing direction;
a polarizing modulation plate which includes a polarizing modulation cell for performing predetermined modulation on the polarizing characteristics of the incident lights; and
a reflection sheet which regularly reflects the incident lights, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
at least two out of the lights emitted from the plurality of light sources include rotatory polarized lights of which rotating directions of polarization are opposite from each other in a stage of the lights entering the light guiding plate, and
the polarizing modulation plate comprises a plurality of types of polarizing modulation cells which function as ¼ wavelength plates having mutually different directions of a slow axis and fast axis.

5. A surface illumination apparatus, comprising:
a light source which emits light;
a light guiding plate which allows the light emitted from the light source to enter through one of the side faces and emits the light through one principal plane;
a polarizing filter which transmits light in a predetermined polarizing direction and reflects light in a polarizing direction perpendicular to the predetermined polarizing direction;
a polarizing modulation plate which performs predetermined modulation on the polarizing characteristics of the incident light; and
a reflection sheet which regularly reflects the incident light, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
the light emitted from the light source includes rotatory polarized light of which rotating direction of polarization can be switched at an arbitrary timing in a stage of the light entering the light guiding plate, and
the polarizing modulation plate comprises a plurality of types of polarizing modulation cells which function as ¼ wavelength plates having mutually different directions of a slow axis and fast axis.

6. A surface illumination apparatus, comprising:
at least three light sources which emit lights having mutually different wavelengths;
a light guiding plate which allows lights emitted from the light sources to enter through one of the side faces and emits the lights through one principal plane;
a polarizing filter which transmits lights in a predetermined polarizing direction and reflects lights in a polarizing direction perpendicular to the predetermined polarizing direction;
a polarizing modulation plate which performs predetermined modulation on the polarizing characteristics of the incident lights; and
a reflection sheet which regularly reflects the incident lights, wherein
the polarizing filter and the polarizing modulation plate are disposed near the one principal plane of the light guiding plate, in order of the polarizing modulation plate and the polarizing filter from the light guiding plate side,
the reflection sheet is disposed near the other principal plane of the light guiding plate on the opposite side to the one principal plane,
at least two out of the lights emitted from the at least three light sources include rotatory polarized lights of which rotating directions of polarization are opposite from each other in a stage of the lights entering the light guiding plate, and
the polarizing modulation plate comprises at least three types of polarizing modulation cells which function as ¼ wavelength plates having mutually different wavelength characteristics.

7. The surface illumination apparatus according to claim 1, wherein the plurality of light sources include two light sources which emit lights having mutually different wavelengths.

8. The surface illumination apparatus according to claim 1, wherein
the plurality of light sources include at least three light sources which emit lights having mutually different wavelengths,
the surface illumination apparatus further comprises a wavelength filter including a plurality of sub-filters which are disposed at the opposite side of the polarizing modulation plate with respect to the polarizing filter and have mutually different filter characteristics, and
the plurality of sub-filters include a sub-filter which transmits light having a predetermined wavelength, and reflects at least a part of lights not having the predetermined wavelength.

9. The surface illumination apparatus according to claim 8, wherein
the three light sources include a blue light source which emits a blue light, a green light source which emits a green light, and a red light source which emits a red light,
the polarizing modulation plate and the polarizing filter separate the green light, and
the wavelength filter separates the blue light and the red light.

10. The surface illumination apparatus according to claim 1, wherein
the polarizing modulation cell arbitrarily and dynamically adjusts a polarizing modulation amount in an arbitrary area for incident lights.

11. The surface illumination apparatus according to claim 3, wherein
the three light sources include a blue light source which emits light having a central wavelength of 400 to 490 nm, a green light source which emits light having a central wavelength of 490 to 570 nm, and a red light source which emits light having a central wavelength of 570 to 680 nm.

12. The surface illumination apparatus according to claim 1, wherein the light source includes a laser light source.

13. The surface illumination apparatus according to claim 1, wherein the light source includes a super-luminescent diode.

14. The surface illumination apparatus according to claim 1, wherein the light source includes a light emitting diode.

15. A liquid crystal display, comprising:
a liquid crystal panel; and
the surface illumination apparatus according to claim 1, which illuminates the liquid crystal panel from the rear face, wherein
the liquid crystal panel has a color filter therein, and is disposed at the opposite side of the polarizing modulation plate with respect to the polarizing filter.

16. The liquid crystal display according to claim 15, wherein
the polarizing modulation plate includes a plurality of modulation cells which are arrayed in a matrix, and
the length of one side of each of the modulation cells is the same as or an integral multiple of the length of one side of a sub-pixel of the color filter.

17. The liquid crystal display according to claim 16, further comprising a reflection coat which is disposed in a boundary area between the modulation cells and reflects the incident light toward the light guiding plate side.

* * * * *